United States Patent
Choi et al.

(10) Patent No.: US 10,659,204 B2
(45) Date of Patent: May 19, 2020

(54) RESOURCE ALLOCATION DEVICE AND METHOD IN LARGE-SCALE ANTENNA SYSTEM

(71) Applicant: Samsung Electronics Co., Ltd., Suwon-si, Gyeonggi-do (KR)

(72) Inventors: Seung-Hoon Choi, Seongnam-si (KR); Hoon-Dong Noh, Suwon-si (KR); Dong-Han Kim, Osan-si (KR); Cheol-Kyu Shin, Suwon-si (KR); Youn-Sun Kim, Seongnam-si (KR); Young-Woo Kwak, Suwon-si (KR); Hyoung-Ju Ji, Seoul (KR); Sang-Min Ro, Seoul (KR); Young-Bum Kim, Seoul (KR); Jeong-Ho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/562,360

(22) PCT Filed: Mar. 28, 2016

(86) PCT No.: PCT/KR2016/003166
§ 371 (c)(1),
(2) Date: Sep. 27, 2017

(87) PCT Pub. No.: WO2016/159621
PCT Pub. Date: Oct. 6, 2016

(65) Prior Publication Data
US 2018/0091273 A1    Mar. 29, 2018

Related U.S. Application Data

(60) Provisional application No. 62/139,347, filed on Mar. 27, 2015, provisional application No. 62/161,398, (Continued)

(51) Int. Cl.
*H04L 5/00* (2006.01)
*H04B 7/06* (2006.01)
(Continued)

(52) U.S. Cl.
CPC .............. *H04L 5/0048* (2013.01); *H04B 7/04* (2013.01); *H04B 7/06* (2013.01); *H04L 5/00* (2013.01); *H04L 25/02* (2013.01); *H04W 24/08* (2013.01)

(58) Field of Classification Search
CPC combination set(s) only.
See application file for complete search history.

(56) References Cited

U.S. PATENT DOCUMENTS 9,025,479 B2   5/2015  Gaal et al.
9,479,306 B2   10/2016 Mazzarese et al.
(Continued)

FOREIGN PATENT DOCUMENTS

CN   103391576 A   11/2013
CN   103959701 A   7/2014
(Continued)

OTHER PUBLICATIONS

Australian Office Action dated Sep. 23, 2019, issued in Australian Patent Application No. 2016241468.
(Continued)

*Primary Examiner* — Khaled M Kassim
*Assistant Examiner* — Syed Ali
(74) *Attorney, Agent, or Firm* — Jefferson IP Law, LLP

(57) ABSTRACT

The present disclosure relates to a 5G or pre-5G communication system for supporting a higher data transmission rate beyond a 4G communication system such as LTE. To this end, a base station using a large-scale antenna transmits, to a terminal, reference signal resource configuration information including multiple pieces of reference signal configu-
(Continued)

ration information and reference signal port information, for transmission of a reference signal, and transmits the reference signal to the terminal using some or all of channel measurement resources indicated by the multiple pieces of reference signal configuration information and the reference signal port information included in the reference signal resource configuration information. In this case, the channel measurement resources may correspond to antenna ports, the number of which is indicated by a combination of the multiple pieces of reference signal configuration information and the reference signal port information.

12 Claims, 26 Drawing Sheets

Related U.S. Application Data filed on May 14, 2015, provisional application No. 62/200,930, filed on Aug. 4, 2015, provisional application No. 62/204,694, filed on Aug. 13, 2015, provisional application No. 62/207,619, filed on Aug. 20, 2015.

(51) Int. Cl.
*H04B 7/04* (2017.01)
*H04L 25/02* (2006.01)
*H04W 24/08* (2009.01)

(56) References Cited

U.S. PATENT DOCUMENTS

| | | | |
|---|---|---|---|
| 10,499,385 | B2 | 12/2019 | Park et al. |
| 2012/0281567 | A1* | 11/2012 | Gao ............... H04B 7/0626 370/252 |
| 2013/0114425 | A1* | 5/2013 | Sayana ............ H04B 7/024 370/252 |
| 2013/0258964 | A1 | 10/2013 | Nam et al. |
| 2013/0258965 | A1 | 10/2013 | Geirhofer et al. |
| 2014/0079149 | A1 | 3/2014 | Lee et al. |
| 2014/0112173 | A1 | 4/2014 | Hammarwall et al. |
| 2014/0177683 | A1 | 6/2014 | Krishnamurthy et al. |
| 2014/0341114 | A1 | 11/2014 | Seo et al. |
| 2015/0180625 | A1* | 6/2015 | Park ............... H04W 72/04 370/329 |
| 2017/0195028 | A1* | 7/2017 | Shimezawa ........ H04W 24/10 |
| 2017/0237535 | A1* | 8/2017 | Park ............... H04B 7/0478 370/329 |
| 2017/0288897 | A1* | 10/2017 | You ................. G01S 5/02 |
| 2017/0359734 | A1* | 12/2017 | Lee ................. H04B 7/0417 |
| 2017/0373744 | A1* | 12/2017 | Froberg Olsson ... H04B 7/0626 |
| 2018/0069612 | A1* | 3/2018 | Yum ................ H04L 1/00 |
| 2018/0227838 | A1* | 8/2018 | Hayashi ............ H04L 5/001 |
| 2018/0254812 | A1* | 9/2018 | Park ............... H04B 7/0626 |
| 2018/0323848 | A1* | 11/2018 | Mizusawa ........... H04B 7/04 |

FOREIGN PATENT DOCUMENTS

| | | |
|---|---|---|
| CN | 104106223 A | 10/2014 |
| EP | 2 773 051 A2 | 9/2014 |
| EP | 2 849 481 A1 | 3/2015 |
| KR | 10-2014-0038120 A | 3/2014 |
| KR | 10-2014-0144261 A | 12/2014 |
| WO | 2013/119073 A1 | 8/2013 |
| WO | 2014/010911 A1 | 1/2014 |
| WO | 2014/020828 A1 | 2/2014 |
| WO | 2014/157824 A1 | 10/2014 |
| WO | 2014/193070 A1 | 12/2014 |

OTHER PUBLICATIONS

Chinese Office Action dated Nov. 6, 2019, issued in Chinese Patent Application No. 201680025772.8.
Huawei, HiSilicon, Discussion on CSI-RS enhancements for EBF/FD-MIMO[online], 3GPP TSG-RAN WG1#80, R1-150054, Athens, Greece, Feb. 13, 2015.
NEC Group, Configuration of CSI processes[online], 3GPP TSG-RAN WG1#70bis, R1-124291, Oct. 12, 2012, San Diego, California.
LG Electronics et al., WF on CSI-RS enhancements, 3GPP TSG RAN WG1 #81, R1-153596, May 27, 2015, Fukuoka, Japan, XP050979871.
Japanese Office Action dated Feb. 3, 2020, issued in the Japanese Patent Application No. 2018-501842.
European Office Action dated Feb. 7, 2020, issued in the European Patent Application No. 16773402.9.
Indonesian Office Action dated Feb. 13, 2020, issued in a counterpart Indonesian Application No. P00201707430.

* cited by examiner

```
CSI-Process-r1x ::=    SEQUENCE {
    csi-ProcessId-r1x              INTEGER (1..maxCSI-Proc-r1x),   ~2810    2820
    antennaPortsCountTotal-r1x     ENUMERATED {an1, an2, an4, an8, an12, an16}
    csi-RS-ConfigNZPId-List-r1x    (SIZE (1..N)) of CSI-RS-ConfigNZPId-r1x,  ~2830
    ...
}

CSI-RS-ConfigNZP-r1x ::=   SEQUENCE {
    csi-RS-ConfigNZPId-r1x         INTEGER {1..maxCSI-RS-NZP-r1x},
    antennaPortsCount-r1x          ENUMERATED {an1, an2, an4, an8},  ~2840
    ...
}
```

FIG.28

```
CSI-Process-r1x ::= SEQUENCE {
    csi-ProcessId-r1x              INTEGER (1..maxCSI-Proc-r1x),              ~ 2910
    antennaPortsCountTotal-r1x     ENUMERATED {an1, an2, an4, an8, an12, an16,...,an64}  ~ 2920
    csi-RS-ConfigNZPId1-r1x        CSI-RS ConfigNZPId-r1x,                    ~ 2930
    csi-RS-ConfigNZPId2-r1x        CSI-RS ConfigNZPId-r1x,
    ...
}

CSI-RS-ConfigNZP-r1x ::= SEQUENCE {
    csi-RS-ConfigNZPId-r1x         INTEGER {1..maxCSI-RS-NZP-r1x},
    antennaPortsCount-r1x          ENUMERATED {an1, an2, an4, an8},           ~ 2940
    ...
}
```

FIG.29

```
CSI-RS-ConfigNZP-r1x ::=   SEQUENCE {
    csi-RS-ConfigNZPId-r1x      INTEGER {1..maxCSI-RS-NZP-r1x},
    antennaPortsCount-r1x       ENUMERATED {an1, an2, an4, an8, an10, an12, an14, an16,...,an40}, ~3010
    resourceConfig-r1x          INTEGER (0..31)  ~3020
    ...
}
```

FIG.30

RESOURCE ALLOCATION DEVICE AND METHOD IN LARGE-SCALE ANTENNA SYSTEM

CROSS-REFERENCE TO RELATED APPLICATION(S)

This application is a U.S. National Stage application under 35 U.S.C. § 371 of an International application filed on Mar. 28, 2016 and assigned application number PCT/KR2016/003166, which claimed the benefit of a U.S. provisional application filed on Mar. 27, 2015 in the U.S. Patent and Trademark Office and assigned Ser. No. 62/139,347, and U.S. provisional application filed on May 14, 2015 in the U.S. Patent and Trademark Office and assigned Ser. No. 62/161,398, and U.S. provisional application filed on Aug. 4, 2015 in the U.S. Patent and Trademark Office and assigned Ser. No. 62/200,930, and U.S. provisional application filed on Aug. 13, 2015 in the U.S. Patent and Trademark Office and assigned Ser. No. 62/204,694, and U.S. provisional application filed on Aug. 20, 2015 in the U.S. Patent and Trademark Office and assigned Ser. No. 62/207,619, the entire disclosure of which is hereby incorporated by reference.

TECHNICAL FIELD

The present disclosure relates to an apparatus and a method for performing resource allocation based on downlink channel status information in a large-scale antenna system.

BACKGROUND ART

In order to meet wireless data traffic demand, which has increased since the commercialization of a $4^{th}$-Generation (4G) communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in an mmWave band (for example, 60 GHz band) is being considered. In the 5G communication system, technologies such as beamforming, massive Multi-Input Multi-Output (MIMO), Full Dimensional MIMO (FD-MIMO), array antennas, analog beam-forming, and large-scale antennas are being discussed to mitigate propagation path loss in the mmWave band and increase the propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes, such as Hybrid FSK and QAM Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA).

DETAILED DESCRIPTION OF THE INVENTION

Technical Problem

A wireless communication system (hereinafter, referred to as a "large-scale antenna system") to which massive MIMO, FD-MIMO, and large-scale antenna technologies being discussed in the 5G communication system are applied assumes that multiple array antennas including a larger number of antennas than multiple antennas in the conventional wireless communication system are used.

For example, the LTE/LTE-A system may support spatial multiplexing for the case in which the number of transmission/reception antennas is 2, 4, or 8. In this case, the system may support ranks up to 8.

Accordingly, it is required to prepare a method of performing high-efficiency data transmission/reception in consideration of a downlink channel status in a large-scale antenna system using 8 or more antennas, which is a relatively greater number than in conventional wireless communication systems.

Various embodiments of the present disclosure may provide an apparatus and a method by which an eNB notifies the UE of configuration information corresponding to a plurality of reference signals for estimating downlink channel statuses and receives feedback information from the UE based on the notified configuration information in a large-scale antenna system.

Various embodiments of the present disclosure may provide an apparatus and a method for generating channel status information for transmitting/receiving data and sharing the generated channel status information between the eNB and the UE in a large-scale antenna system.

Various embodiments of the present disclosure may provide an apparatus and a method by which the eNB configures Channel Status Information-Reference Signals (CSI-RSs) for supporting large-scale antennas in a large-scale antenna system.

Various embodiments of the present disclosure may provide an apparatus and a method by which the UE measures radio channel statuses and transmits feedback on channel status information based on the measurement to the eNB in a large-scale antenna system.

Various embodiments of the present disclosure may provide an apparatus and a method by which the UE configures channel status information considering Single-User MIMO (SU-MIMO) and Multi-User MIMO (MU-MIMO) and transmits feedback to the eNB in a large-scale antenna system.

Various embodiments of the present disclosure may provide an apparatus and a method by which the eNB transmits/receives data to/from the UE based on a multi-transmission mode determined as one of an SU-MIMO mode and an MU-MIMO mode on the basis of channel status information fed back from the UE in a large-scale antenna system.

Technical Solution

In accordance with an aspect of the present disclosure, a method of transmitting a reference signal for measuring a downlink channel status by an evolved NodeB (eNB) using a large-scale antenna is provided. The method includes: receiving radio resource configuration information from an evolved NodeB (eNB); acquiring channel status information corresponding to each of a single-user mode and a multi-user mode according to a multi-access scheme at least based on one or a plurality of channel status indication reference signals received through the received radio resource configuration information; determining one of the single-user mode and the multi-user mode as a transmission mode based on the acquired channel status information corresponding to the single-user mode and the acquired channel status information corresponding to the multi-user mode, and transmitting feedback on transmission mode identification information indicating the determined transmission mode to the eNB through the communication unit.

In accordance with another aspect of the present disclosure, a wireless User Equipment (UE) for reporting a channel status in a wireless communication system of a multi-access scheme using multiple carriers is provided. The wireless UE includes: a communication unit that receives radio resource configuration information from an evolved NodeB (eNB) and transmits channel status information to the eNB; and a controller that acquires channel status information corresponding to each of a single-user mode and a multi-user mode according to a multi-access scheme at least based on the received radio resource configuration information, determines one of the single-user mode and the multi-user mode as a transmission mode based on the acquired channel status information corresponding to the single-user mode and the acquired channel status information corresponding to the multi-user mode, and transmits feedback on transmission mode identification information indicating the determined transmission mode to the eNB through the communication unit.

In accordance with another aspect of the present disclosure, an evolved NodeB (eNB) for transmitting a reference signal for measuring a downlink channel status in a wireless communication system using a large-scale antenna is provided. The eNB includes: a controller that generates one piece of reference signal configuration information including a plurality of reference signal configuration groups configured for feedback of channel status information; and a communication unit that transmits the generated one piece of reference signal configuration information to a User Equipment (UE), wherein each of the plurality of reference signal configuration groups includes information indicating reference signal ports to be used for measuring a downlink channel status among resource elements included in a predetermined resource allocation area.

In accordance with another aspect of the present disclosure, a method of transmitting a reference signal for measuring a downlink channel status by an evolved NodeB (eNB) using a large-scale antenna is provided. The method includes: transmitting reference signal resource configuration information including a plurality of pieces of reference signal configuration information and reference signal port information to a User Equipment (UE) for transmission of the reference signal; and transmitting the reference signal to the UE through some or all of channel measurement resources indicated by the plurality of pieces of reference signal configuration information and the reference signal port information included in the reference signal resource configuration information, wherein the channel measurement resources correspond to antenna ports of a number indicated by a combination of the plurality of pieces of reference signal configuration information and the reference signal port information.

In accordance with another aspect of the present disclosure, an evolved NodeB (eNB) for transmitting a reference signal for measuring a downlink channel status in a wireless communication system using a large-scale antenna is provided. The eNB includes: a controller that configures reference signal resource configuration information including a plurality of pieces of reference signal configuration information and reference signal port information for transmission of the reference signal; and a communication unit that transmits the reference signal resource configuration information to the UE and transmits the reference signal through some or all of channel measurement resources indicated by the plurality of pieces of reference signal configuration information and the reference signal port information included in the reference signal resource configuration information, wherein the channel measurement resources correspond to antenna ports of a number indicated by a combination of the plurality of pieces of reference signal configuration information and the reference signal port information.

In accordance with another aspect of the present disclosure, a method of reporting a channel status by a wireless User Equipment (UE) in a wireless communication system of a multi-access scheme using multiple carriers is provided. The method includes: receiving reference signal resource configuration information including a plurality of pieces of reference signal configuration information and reference signal port information from an evolved NodeB (eNB); receiving the reference signal through some or all of channel measurement resources indicated by the plurality of pieces of reference signal configuration information and the reference signal port information included in the reference signal resource configuration information; and reporting feedback information attributable to a downlink channel status based on measurement of the received reference signal to the eNB, wherein the channel measurement resources correspond to antenna ports of a number indicated by a combination of the plurality of pieces of reference signal configuration information and the reference signal port information.

In accordance with another aspect of the present disclosure, a wireless User Equipment (UE) for reporting a channel status in a wireless communication system of a multi-access scheme using multiple carriers is provided. The wireless UE includes: a communication unit that receives reference signal resource configuration information including a plurality of pieces of reference signal configuration information and reference signal port information from an evolved NodeB (eNB) and reports feedback information attributable to a downlink channel status to the eNB; and a controller that controls the communication unit to receive the reference signal through some or all of channel measurement resources indicated by the plurality of pieces of reference signal configuration information and the reference signal port information included in the reference signal resource configuration information and configures the feedback information attributable to the downlink channel status based on measurement of the received reference signal, wherein the channel measurement resources correspond to antenna ports of a number indicated by a combination of the plurality of pieces of reference signal configuration information and the reference signal port information.

BRIEF DESCRIPTION OF THE DRAWINGS

FIG. 28 illustrates an example of one CSI process in which a plurality of CSI-RSs is configured according to various embodiments proposed by the present disclosure;

FIG. 29 illustrates another example of one CSI process in which a plurality of CSI-RSs is configured according to various embodiments proposed by the present disclosure;

FIG. 30 illustrates another example of configuring CSI-RS ports according to various embodiments proposed by the present disclosure;

MODE FOR CARRYING OUT THE INVENTION

Hereinafter, embodiments proposed in the present disclosure will be described in detail with reference to the accompanying drawings. In describing the embodiments proposed herein, a detailed description of related functions or configurations known in the art will be omitted when it is determined that the detailed description thereof may unnecessarily obscure the subject matter of the present disclosure. The terms as described below are defined in consideration of the functions in the embodiments proposed herein, and the meaning of the terms may vary according to the intention of a user or operator, convention, or the like. Therefore, the terms should be defined on the basis of the contents throughout the specification.

Figure 1:
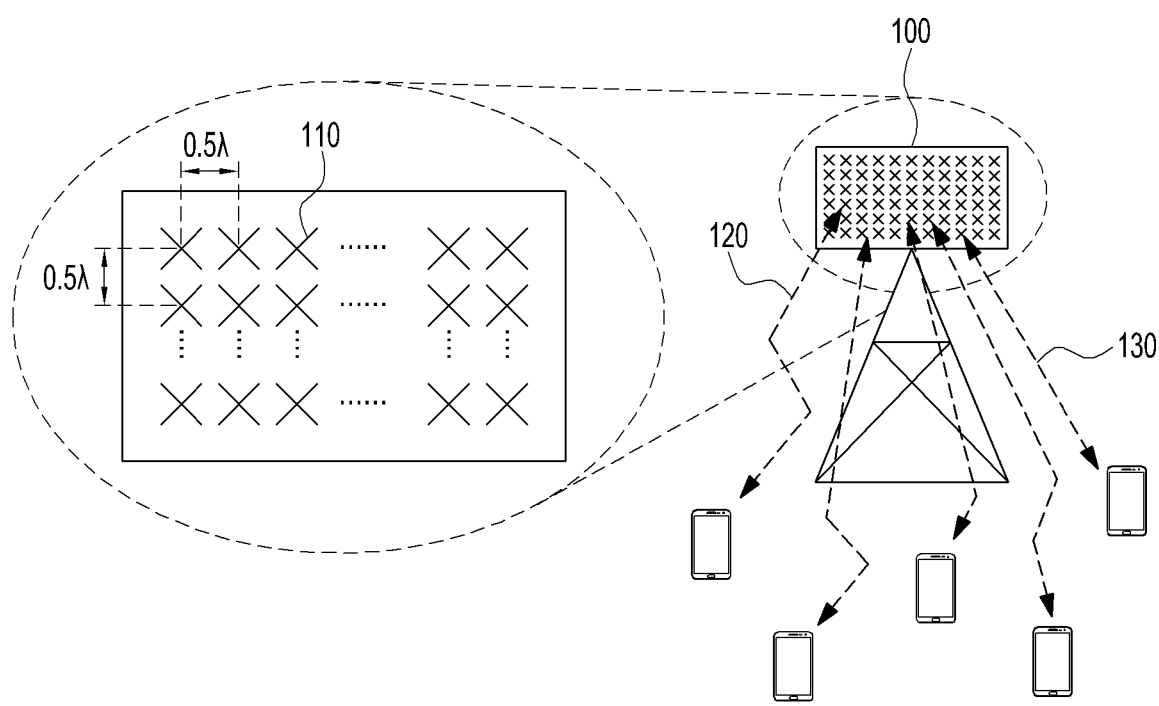
FIG. 1 illustrates an FD-MIMO system according to various embodiments proposed by the present disclosure.

FIG. 1 illustrates an FD-MIMO system according to various embodiments proposed by the present disclosure.

Referring to FIG. 1, an evolved NodeB (eNB) transmits a radio signal through an antenna set 100. A plurality of transmission antennas (for example, 8 or more antennas) included in the antenna set 100 is arranged such that a minimum distance therebetween is maintained (reference numeral 110).

The eNB may transmit radio signals to a plurality of User Equipments (UEs) by high-order Multi-User (MU) MIMO using a plurality of transmission antennas included in the antenna set 100. The high-order MU-MIMO allocates spatially separated transmission beams to the plurality of UEs through a plurality of eNB transmission antennas to transmit data. The high-order MU-MIMO may be achieved using the same time and frequency resources.

In the FD-MIMO system, the UE should accurately measure a channel status and the size of interference and transmit effective channel status information to the eNB based thereon. The eNB may determine the transmission mode (SU-MIMO or MU-MIMO) to be applied to the UE, the transmission rate, precoding, and the like based on channel status information. In order to support the MU-MIMO, the eNB is required to receive feedback on channel status information for the MU-MIMO from the UE.

Accordingly, embodiments to be proposed by the present disclosure provide a method by which the BS may selectively apply one of the SU-MIMO and the MU-MMO to a particular UE as a transmission mode in the FD-MIMO system.

Figure 2:
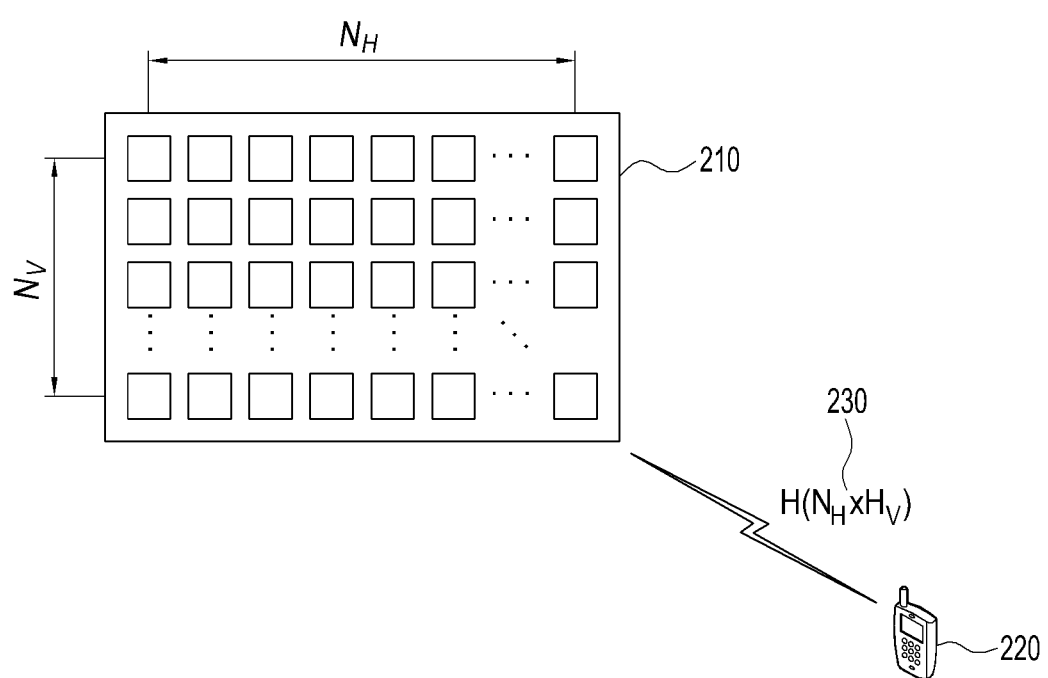
FIG. 2 illustrates an example of an antenna array in a wireless communication system according to various embodiments proposed by the present disclosure.

FIG. 2 illustrates an example of an antenna array in a wireless communication system according to various embodiments proposed by the present disclosure.

Referring to FIG. 2, an antenna set in the massive MIMO system or the FD-MIMO system may include multiple antennas (8 or more antennas) arranged in two dimensions. The antenna set may include, for example, scores of or more transmission antennas. The plurality of transmission antennas is arranged such that a predetermined distance is maintained therebetween. The predetermined distance may correspond to a multiple of half a wavelength of the transmitted radio signal.

A transmission device of the eNB may transmit a signal to the UE through, for example, $N_H$ antennas arranged on a horizontal axis and $N_V$ antennas arranged on a vertical axis. In this case, the transmission device of the eNB may apply precoding to each of a plurality of transmission antennas and transmit signals to a plurality of UEs based on the precoding.

Accordingly, embodiments to be proposed by the present disclosure provide a method of performing proper distribution between resources for reference signals and resources for traffic channel transmission to derive the optimal performance in terms of total system capacity in the massive MIMO system or the FD-MIMO system.

Figure 3:
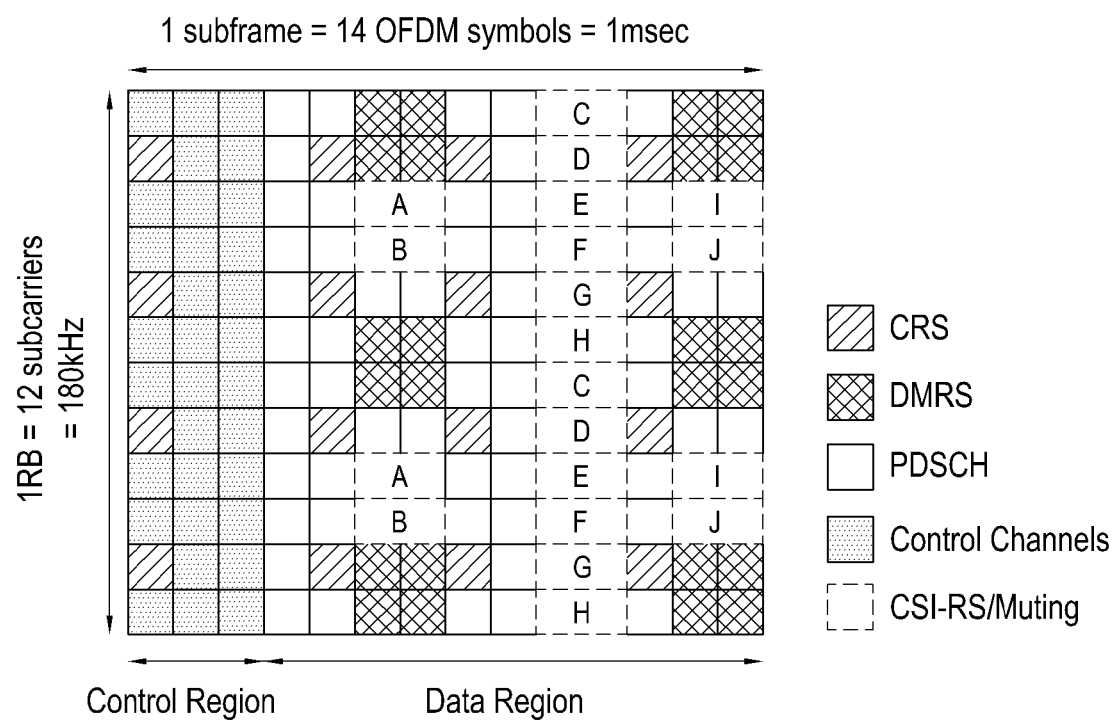
FIG. 3 illustrates an example of radio resources in the FD-MIMO system according to various embodiments proposed by the present disclosure.

FIG. 3 illustrates an example of radio resources in the FD-MIMO system according to various embodiments proposed by the present disclosure.

Referring to FIG. 3, radio resources may be defined by a time axis and a frequency axis. The time axis may consist of one subframe. The frequency axis may consist of one Resource Block (RB). The one subframe may include 14 OFDM symbols and the one resource block may include 12 subcarriers. In this case, the radio sources may consist of 168 Resource Elements (REs) having inherent frequency and time locations.

In the radio resources, different types of signals such as a Cell-specific RS (CRS), a Demodulation Reference Signal (DMRS), a Physical Downlink Shared Channel (PDSCH), a Channel Status Information Reference Signal (CSI-RS), other control channels (PHICH, PCFICH, and PDCCH), and the like may be transmitted.

The CRS is a reference signal periodically transmitted for all UEs belonging to one cell. The CRS may be used by a plurality of UEs in common. The DMRS is a reference signal transmitted for a particular UE. The DMRS may be transmitted only when data is transmitted to the corresponding UE. The PDSCH is a data channel transmitted through a downlink and may be transmitted using an RE through which a reference signal is not transmitted in a data region. The CSI-RS is a reference signal transmitted for UEs belonging to one cell and may be used to measure a channel status. A plurality of CSI-RSs may be transmitted in one cell. The other control channels (PHICH, PCFICH, and PDCCH) may be used for providing control information required for receiving the PDSCH or transmitting ACK/NACK for operating HARQ with respect to data transmission of the uplink by the UE.

The eNB may transmit CSI-RSs in some or all of REs at positions marked by A, B, C, D, E, F, G, H, I, and J or may apply muting. The CSI-RSs may be transmitted using 2, 4, or 8 REs depending on the number of transmission antenna ports.

For example, half CSI-RSs of a particular pattern are transmitted when the number of antenna ports is 2, all CSI-RSs of the particular pattern are transmitted when the number of antenna ports is 4, and two patterns of CSI-RSs are transmitted when the number of antenna ports is 8.

The UE may receive CSI-IM (or Interference Measurement Resources: IMRs) as well as the CSI-RS from the eNB. Resources of the CSI-IM may have the same resource structure and location as those of the CSI-RS supporting 4 ports. The CSI-IM corresponds to resources for accurately measuring interference from adjacent eNBs by the UE receiving data from one or more eNB. For example, the eNB may configure CSI-RSs and two CSI-IM resources and make an adjacent eNB always transmit a signal in one CSI-IM and not transmit a signal in the other CSI-IM so as to measure the amount of interference from the adjacent eNB.

The eNB may transmit a reference signal, that is, a CRS or a Channel Status Information Reference Signal (CSI-RS), to the UE to measure a downlink channel status. The UE may measure a channel status between the eNB and the UE based on the CRS or the CSI-RS transmitted by the eNB. In order to measure the channel status, some elements should be essentially considered. Here, an interference amount in the downlink may be included. The interference amount in the downlink may include an interference signal and thermal noise generated by an antenna included in an adjacent eNB. The interference amount in the downlink may be important to determine the downlink channel status by the UE.

The terminal may transmit feedback on information on the downlink channel status to the eNB. The UE measures, for example, the reference signal transmitted by the eNB and transmits feedback on information extracted by the measurement to the eNB. The information fed back by the UE may contain a Rank Indicator (RI), a Precoder Matrix Indicator (PMI), a Channel Quality Indicator (CQI), and the like.

The RI is the number of particular layers (spatial layers) on which the UE can perform reception in a current channel status, the PMI is an indicator of a precoding matrix that the UE prefers in the current channel status, and the CQI is a maximum data transmission rate at which the UE can perform reception in the current channel status. The CQI may be replaced with a Signal energy to-Interference-plus-Noise Radio (SINR), a maximum error correction coding rate and modulation scheme, a data efficiency per frequency, and the like, which can be used similarly to the maximum data transmission rate.

The RI, the PMI, and the CQI are correlated with each other. For example, the precoding matrix may be defined differently according to each rank. Accordingly, even though the value of the PMI when the RI is 1 and the value of the PMI when the RI is 2 are the same as each other, they are interpreted differently. Further, it is assumed that a rank value and a PMI value, which the UE provides to the eNB are applied to the eNB when determining the CQI. That is, when the UE provides RI_X, PMI_Y, and CQI_Z to the eNB, if the rank is RI_X and the precoding is PMI_Y, it means that the UE can perform reception at a data transmission rate corresponding to CQI_Z. As described above, when the UE calculates the CQI, the UE assumes a scheme for transmission to the eNB so that the UE may obtain optimal performance in actual transmission through the corresponding transmission scheme.

The eNB having large-scale antennas to generate and report the channel information should configure reference signal resources for measuring channels of 8 or more antennas and transmit the configured reference signal resources to the UE. In this case, although available CSI-RS resources may use a maximum of 48 REs, it is possible to set up to 8 CSI-RSs per cell at present. Accordingly, in order to support the FD-MIMO system operating based on 8 or more CSI-RS ports, a new CSI-RS configuration method is needed.

Figure 4:
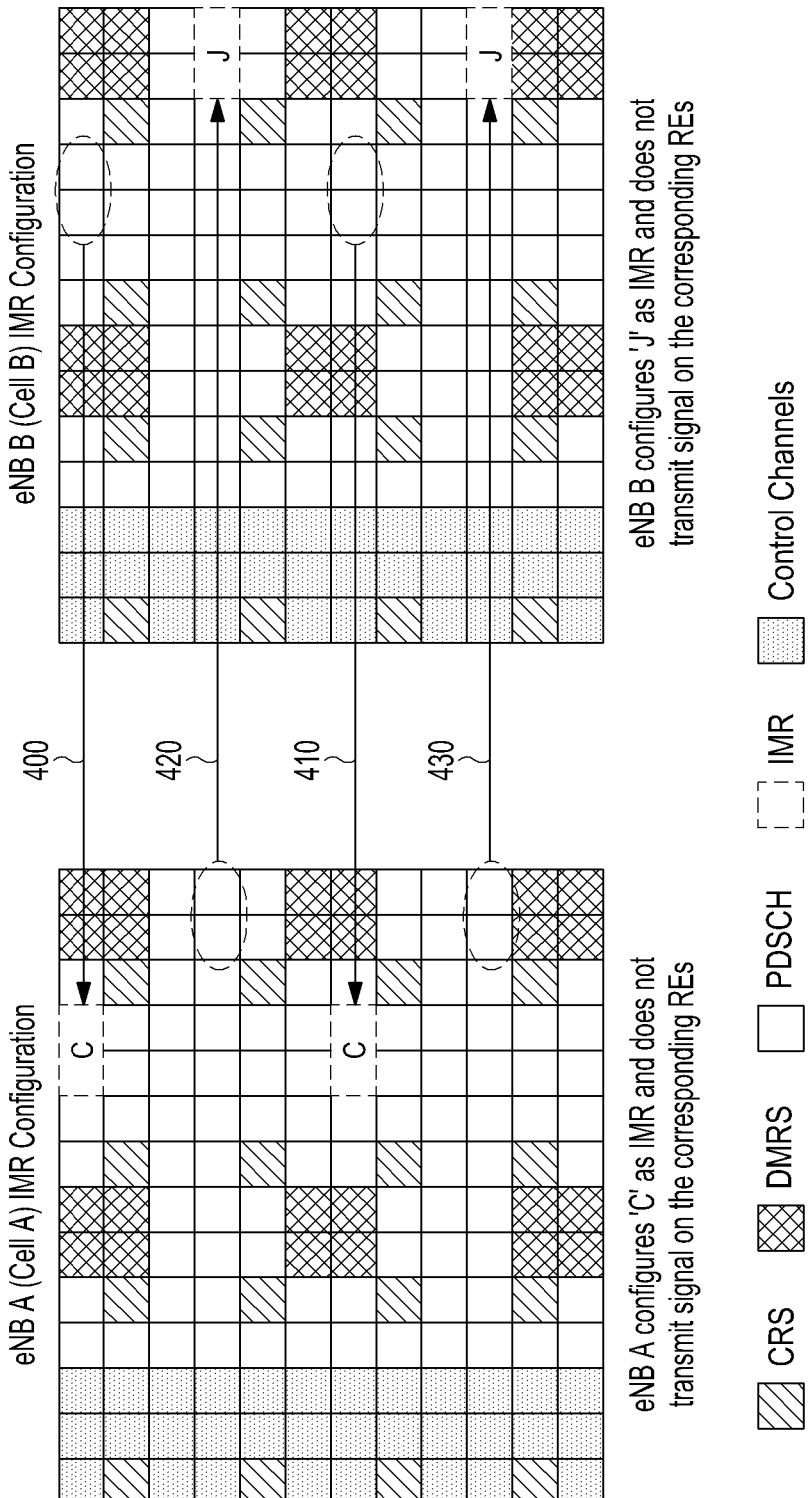
FIG. 4 illustrates signals transmitted by two eNBs to which Interference Measurement Resources (IMRs) are applied according to various embodiments proposed by the present disclosure.

FIG. 4 illustrates signals transmitted by two eNBs to which IMRs are applied according to various embodiments proposed by the present disclosure.

Referring to FIG. 4, eNB A sets IMR C for a UE located within cell A. eNB B sets IMR J for a UE located within cell B. That is, UEs located within cell A receive a PDSCH transmitted by eNB A, and accordingly, should notify channel status information to eNB A.

In order to generate the channel status information, the UE is required to measure Es/(Io+No) of a channel (signal energy to interference and noise strength). Based on the IMR, the UE may measure the interference and noise strength.

When eNB A and eNB B transmit signals at the same time, they may interfere with each other. That is, the signal transmitted by eNB B may act as interference to the UE receiving the signal from eNB A. Further, the signal transmitted by eNB A may act as interference to the UE receiving the signal from eNB B.

eNB A sets IMR C in the corresponding UE to enable the UE located within cell A to measure interference generated due to eNB B. eNB A does not transmit the signal at the location of IMR C. As a result, the signal that the UE receives on IMR C is a signal transmitted by eNB B, as indicated by reference numerals 400 and 410. That is, the UE receives only a signal transmitted by eNB B in IMR C and measures a reception strength of the signal so as to determine an interference strength generated by eNB B. Similarly, eNB B sets IMR J in the corresponding UE to enable the UE located within cell B to measure the interference generated due to eNB A. In this case, eNB B does not transmit a signal at a location of IMR J.

When the IMR is used, the magnitude of interference generated by another eNB or at a transmission position may be effectively measured. That is, in a multi-cell mobile communication system in which a plurality of cells coexists or in a distributed antenna system, the magnitude of interference generated in an adjacent cell or the magnitude of interference generated at an adjacent transmission position may be effectively measured based on the IMR. Further, the magnitude of MU-MIMO interference may be also measured using the IMR.

Embodiments to be proposed based on the above description may provide a method of performing efficient resource allocation by the eNB as the UE reports channel status information corresponding to the downlink to the eNB in the massive MIMO system or the FD-MIMO system.

According to an embodiment for this, a method of selectively applying the SU-MIMO or the MU-MIMO to a particular UE in the massive MIMO system or the FD-MIMO system is provided.

According to an embodiment for this, a method of performing proper distribution between resources for reference signals and resources for traffic channel transmission to derive the optimal performance in terms of total system capacity in the massive MIMO system or the FD-MIMO system is provided.

Figure 5:
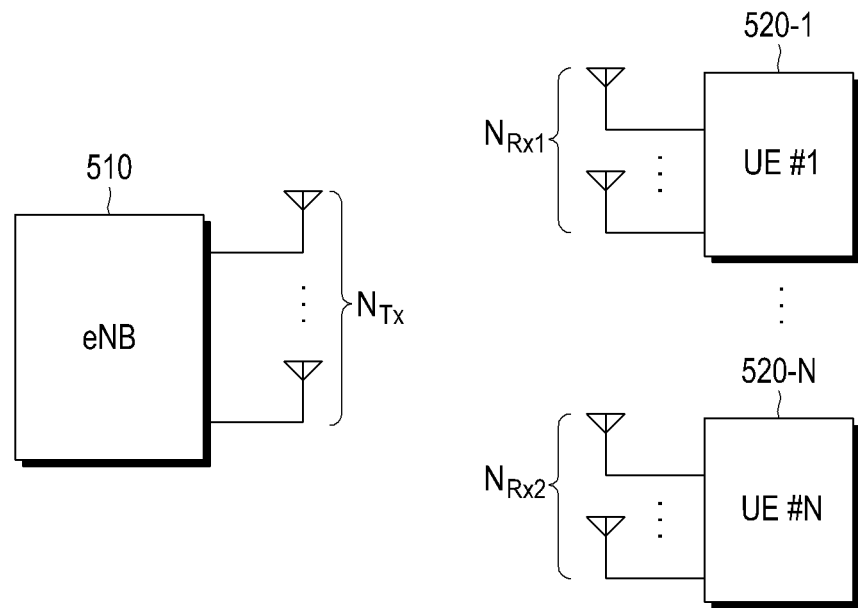
FIG. 5 illustrates an example of a wireless communication system supporting a multi-access scheme according to various embodiments proposed by the present disclosure.

FIG. 5 illustrates an example of a wireless communication system supporting a multi-access scheme according to various embodiments proposed by the present disclosure.

Referring to FIG. 5, an eNB 510 manages multiple cells and may transmit/receive signals to/from UEs (UE #1 520-1 to UE #N 520-N) distributed in the multiple cells. The eNB 510 may transmit or receive signals based on a multi-access scheme using a multi-carrier such as Orthogonal Frequency Division Multiple Access (OFDMA).

In order to support the multi-access scheme, the eNB 510 and UE #1 520-1 to UE #N 520-N may include multiple transmission or reception antennas. It is assumed that the eNB 510 includes $N_{Tx}$ transmission antennas and that each of UE #1 520-1 to UE #N 520-N includes $N_{Rx1}$ or $N_{Rx2}$ reception antennas.

The eNB 510 may transmit configuration information and reference signals for channel estimation to UE #1 520-1 to UE #N 520-N. The configuration information may contain configuration information of the CSI-RS and all or some pieces of RRC information.

The eNB 510 may receive feedback information from the UE at a timing determined by the configuration information. The eNB 510 may determine the transmission method at least based on the received feedback information. In this case, the eNB may transmit or receive a signal to or from the UE based on the determined transmission method.

UE #1 520-1 to UE #N 520-N may receive configuration information from the eNB 510. UE #1 520-1 to UE #N 520-N may perform channel estimation based on a reference signal (CSI-RS or the like) received from the eNB 510. UE #1 520-1 to UE #N 520-N may configure feedback information based on information attributable to the channel estimation and transmit the configured feedback information to the eNB 510 at a timing determined by the configuration information. In this case, UE #1 520-1 to UE #N 520-N may transmit or receive a signal to or from the eNB 510 through the transmission method determined by the eNB 510 at least based on the feedback information.

Figure 6:
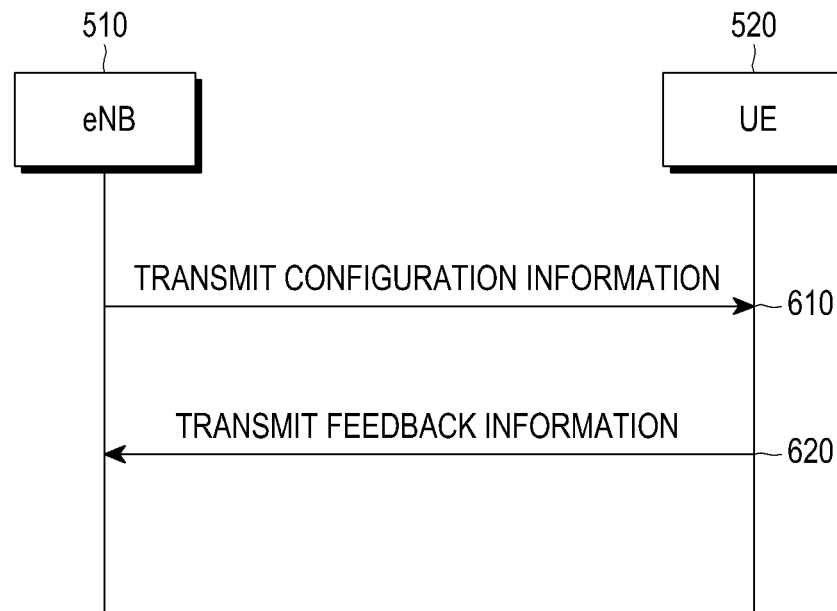
FIG. 6 illustrates a channel estimation procedure in a wireless communication system supporting a multi-access scheme according to various embodiments proposed by the present disclosure.

FIG. 6 illustrates a channel estimation procedure in a wireless communication system supporting a multi-access scheme according to various embodiments proposed by the present disclosure.

Referring to FIG. 6, in step 610, the eNB 510 may transmit configuration information and a reference signal for channel estimation to the UE 520, and the UE 520 may receive the configuration information and the reference signal for the channel estimation transmitted by the eNB 510. The configuration information may contain configuration information of the CSI-RS and all or some pieces of RRC information.

According to an embodiment, the eNB 510 may generate channel status information for performing effective data transmission/reception and provide the configuration information with the generated channel status information to the UE 520.

In step 620, the UE 520 may transmit feedback information prepared based on the result based on the channel estimation to the eNB 510, and the eNB 510 may receive the feedback information transmitted by the UE 520. The feedback information may further contain a SU/MU Indicator (SMI) as well as the RI, the PMI, and at least one of an sCQI and a wCQI. The SMI is information indicating one of an SU-MIMO mode and an MU-MIMO mode corresponding to preferred multiple transmission modes in consideration of the current channel status through the downlink channel estimation.

Figure 7:
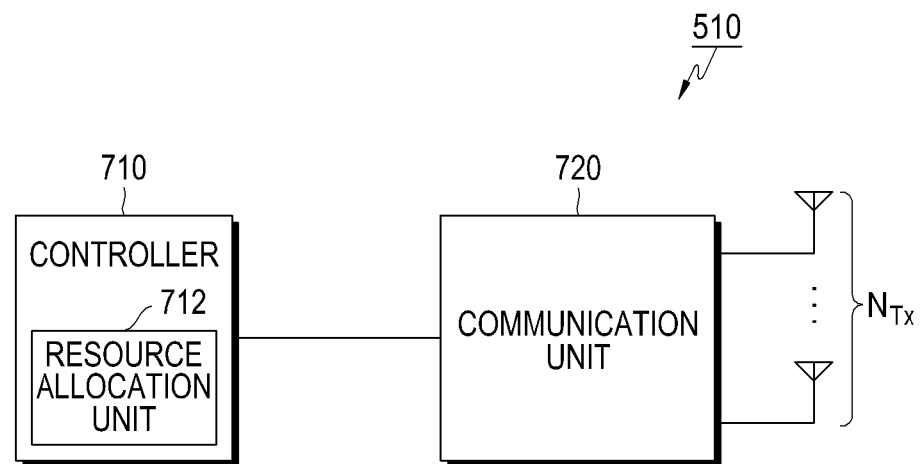
FIG. 7 illustrates a structure of the eNB according to various embodiments proposed by the present disclosure.

FIG. 7 illustrates the structure of the eNB according to various embodiments proposed by the present disclosure.

Referring to FIG. 7, the eNB may include a controller 710 and a communication unit 720. The controller 710 may control the status and operation of all elements included in the eNB. The communication unit 720 may communicate with a counterpart device (for example, the UE) under the control of the controller 710.

The controller 710 may allocate, for example, CSI-RS resources for channel estimation by the UE to the UE. The channel estimation using the CSI-RS resources may include channel estimation for all of horizontal and vertical components. The controller 710 may allocate feedback resources and feedback timing to the UE. The controller 710 may receive feedback information reported by a particular UE at feedback timing allocated to the particular UE and analyze the received feedback information. To this end, the controller 710 may include a resource allocation unit 712 therein.

The resource allocation unit 712 may allocate the CSI-RS to each resource to enable to the UE to estimate each of vertical and horizontal component channels and transmit the CSI-RS to the counterpart device through the communication unit 720 based on the corresponding resource. The resource allocation unit 712 may allocate feedback configuration and feedback timing to each UE to avoid collision of feedback information from multiple UEs and receive feedback information set at corresponding timing. The resource allocation unit 712 may also analyze the received feedback information.

Although FIG. 7 illustrates the resource allocation unit 712 as a separate block within the controller 710, the present disclosure is not necessarily limited thereto. For example, the function that the resource allocation unit 712 performs may be performed by the controller 710, and in this case, the resource allocation unit does not need to be configured as a separate block. Further, the resource allocation unit 712 may be implemented as a separate element for constituting the eNB rather than the element within the controller 710.

According to an embodiment, the controller 710 may determine whether SU-MIMO transmission is suitable for the corresponding UE or MU-MIMO transmission is suitable for the corresponding UE based on feedback information reported by each UE. The controller 710 may support the SU-MIMO transmission or the MU-MIMO transmission for the corresponding UE based on the result of the determination.

More specifically, the controller 710 may control the communication unit 720 to transmit configuration information of each of at least two reference signals to the UE. The controller 710 may measure the at least two reference signals. The controller 710 may control the communication unit 720 to transmit feedback configuration information to the UE. The feedback configuration information may be configured to enable the UE to generate feedback information attributable to the result of measurement of the at least two reference signals.

In this case, the controller 710 may transmit the at least two reference signals to the UE and control the communication unit 720 to receive feedback information transmitted from the UE at feedback timing specified in the feedback configuration information.

According to the above-description, in the FD-MIMO system in which MU-MIMO transmission can be more frequently performed, the eNB may receive feedback on a Channel Quality Indicator (CQI) from the UE. The CQI may indicate whether SU-MIMO transmission is suitable or MU-MIMO transmission is suitable. In this case, it is possible to prevent the UE from transmitting unnecessary feedback on channel information for MU-MIMO and enable the eNB to operate one of SU-MIMO and MU-MIMO to fit a channel environment.

According to another embodiment, the controller 710 may perform the general operation for transmitting and receiving high-efficiency data based on FD-MIMO transmission. The controller 710 may notify the UE of configuration information of multiple CSI-RSs, so that the UE may generate feedback information according to the provided configuration information.

More specifically, the controller 710 may transmit configuration information for each of one or more reference signals to the UE by controlling the communication unit 720. The controller 710 may generate the one or more reference signals. The controller 710 may transmit feedback configuration information for enabling the UE to generate feedback information attributable to the measurement result to the UE by controlling the communication unit 720.

The controller 710 may control the communication 720 to transmit the one or more reference signals to the UE and receive the feedback information transmitted from the UE through the communication unit 720 at feedback timing set forth in the feedback configuration information.

The controller 710 may transmit, for example, the feedback configuration information to the UE, transmit the CSI-RS to the UE, and receive the feedback information generated based on the feedback configuration information and the CSI-RS from the UE. In this case, the controller 710 may control the communication unit 720 to transmit, to the UE, feedback configuration information corresponding to each antenna port group of the eNB and additional feedback configuration information on the basis of the relationship between antenna port groups.

The controller 710 may transmit, for example, a CSI-RS beamformed based on the feedback information to the UE and receive the feedback information generated based on the CSI-RS from the UE.

According to the above-described embodiment, the eNB may set various numbers of CSI-RSs to fit the number of TXRU operated by the eNB or other communication circumstances. In this case, as the UE effectively generates channel status information suitable for configuration of the eNB, CQI mismatch can be reduced and additional processing for the reported channel status information by the eNB can be also reduced.

The communication unit 720 may transmit/receive data, the reference signal and feedback information to/from the UE. The communication unit 720 may transmit the CSI-RS to the UE through allocated resources and receive channel information fed back from the UE under the control of the controller 710.

Figure 8:
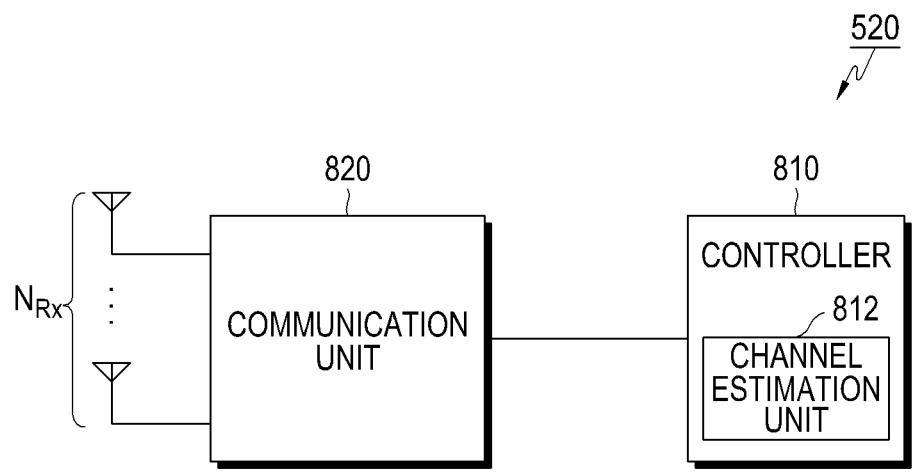
FIG. 8 illustrates a structure of the UE according to various embodiments proposed by the present disclosure.

FIG. 8 illustrates the structure of the UE according to various embodiments proposed by the present disclosure.

Referring to FIG. 8, the UE may include a controller 810 and a communication unit 820. The controller 810 may control the statuses and operations of all elements included in the UE. The communication unit 820 may communicate with a counterpart device (for example, the eNB) under the control of the controller 810.

The UE may further include various elements according to the functions that are performed. The UE may further include, for example, a display unit for displaying the current status, an input unit into which a signal for performing a function is input from the user, and a storage unit for storing data.

The controller 810 may generate, for example, feedback information according to information received from the eNB. The controller 810 may control the communication 820 to transmit feedback on generated channel information according to timing information received from the eNB. To this end, the controller 810 may include a channel estimation unit 812 therein.

The channel estimation unit 812 may determine required feedback information through the CSI-RS and feedback allocation information received from the eNB and estimate a channel based on the received CSI-RS.

Although FIG. 8 illustrates the channel estimation unit 812 as a separate block within the controller 810, the present disclosure is not necessarily limited thereto. For example, the function that the channel estimation unit 812 performs may be performed by the controller 810, in which case the channel estimation unit 812 does not need to be configured as a separate block. Further, the channel estimation unit 812 may be implemented as a separate element for constituting the eNB rather than an element within the controller 810.

According to an embodiment, the controller 810 may control the communication unit 820 to receive configuration information of each of one or more reference signal resources or configuration information of each of two or more reference signals from the eNB. The controller 810 may control the communication unit 820 to receive feedback configuration information from the eNB. The feedback configuration information may be considered when the UE measures two or more reference signals transmitted by the eNB and generates feedback information according to the result of the measurement.

The controller 810 may measure each of the one or more reference signals or the two or more reference signals received through the communication unit 820 and generate feedback information based on the result of the measurement and the feedback configuration information. The controller 810 may control the communication unit 820 to transmit the generated feedback information to the eNB at feedback timing set forth in the feedback configuration information.

The controller 810 may receive, for example, a Channel Status Indication-Reference Signal (CSI-RS) from the eNB and generate feedback information based on the CSI-RS. The controller 810 may transmit the generated feedback information to the eNB. In this instance, the controller 810 may select a precoding matrix for each antenna port group of the eNB and further select one additional precoding matrix based on the relationship between the antenna port groups of the eNB.

The controller 810 may receive, for example, the CSI-RS from the eNB and generate feedback information based on the received CSI-RS. The controller 810 may transmit the generated feedback information to the eNB. In this case, the controller 810 may select one precoding matrix for all antenna port groups of the eNB.

The controller 810 may receive, for example, feedback configuration information from the eNB, receive the CSI-RS from the eNB, and generate feedback information based on the received feedback configuration information and the received CSI-RS. The controller 810 may transmit the generated feedback information to the eNB. In this case, the controller 810 may receive additional feedback configuration information based on feedback configuration information corresponding to each antenna port group of the eNB and the relationship between the antenna port groups.

The communication unit 820 may transmit or receive various forms of signals including data to or from a counterpart device (for example, the eNB) through at least one of various communication schemes. The communication unit 820 may be controlled by the controller 810 for communication with the counterpart device.

The communication unit 820 may transmit channel quality indicator information for effectively performing transmission operations of SU-MIMO and MU-MIMO to the counterpart device, that is, the eNB, under the control of the controller 810. The communication unit 820 may transmit feedback information to the eNB under the control of the controller 810.

Figure 9:
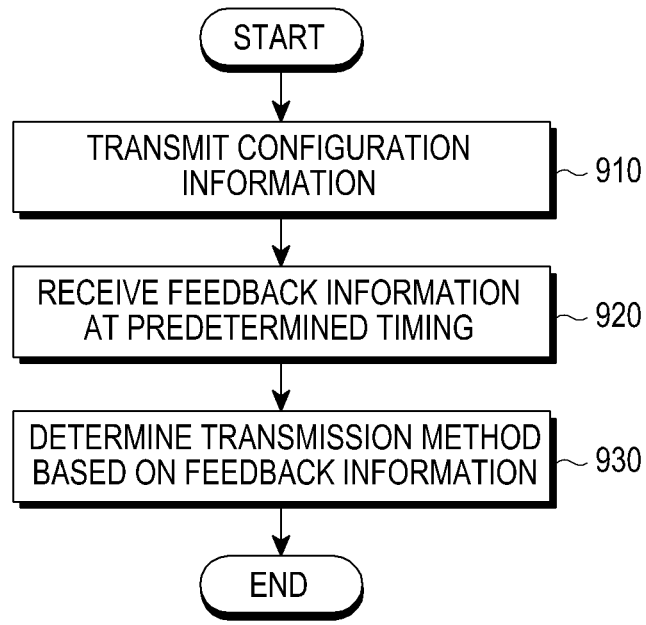
FIG. 9 illustrates a control flow occurring in the eNB according to various embodiments proposed by the present disclosure.

FIG. 9 illustrates a control flow occurring in the eNB according to various embodiments proposed by the present disclosure.

Referring to FIG. 9, the eNB may transmit configuration information to the UE in step 910. The eNB may receive feedback information from the UE at a timing determined by the configuration information in step 920. The eNB may determine a transmission method at least based on the received feedback information in step 930. In this case, the eNB may transmit or receive a signal to or from the UE based on the determined transmission method.

According to an embodiment, the eNB may configure eNB configuration information and transmit the configured eNB configuration information to the UE. The eNB configuration information may contain configuration information on a CSI-RS and all or some pieces of RRC information. An example of the eNB configuration information may be defined as [Table 1] below.

TABLE 1

| eNB configuration information |
| --- |
| CSI-RS setting |
| First channel information (MU-MIMO): CSI-RS-1 |
| Second channel information (SU-MIMO): CSI-RS-2 |
| Reporting (feedback) mode |
| PMI codebook information |
| etc. |

Referring to [Table 1] above, the eNB configuration information may contain CSI-RS configuration information (CSI-RS setting). The CSI-RS configuration information may be used for identifying, by the UE, some or all of the number of ports for each CSI-RS, timing and a resource location at which each CSI-RS is transmitted, sequence information, and $P_c$ information. For example, the eNB may give the $P_c$ value to the UE. In this case, the $P_c$ value which the eNB gives to the UE may be used for calculating accurate CQI for the PDSCH.

The eNB configuration information may contain information corresponding to a plurality of pieces of channel information. For example, when corresponding feedback is for two CSI-RSs (CSI-RS-1 and CSI-RS-2), the eNB configuration information may contain information (first channel information (SU-MIMO): CSI-RS-1) corresponding to first channel information for the two CSI-RSs (CSI-RS-1 and CSI-RS-2) and information (second channel information (MU-MIMO): CSI-RS-2) corresponding to second channel information.

It may be assumed that the first channel information and the second channel information indicate CSI-RSs corresponding to SU-MIMO and MU-MIMO, respectively. Conversely, it may be also assumed that the first channel information and the second channel information indicate CSI-RSs corresponding to MU-MIMO and SU-MIMO, respectively.

The eNB configuration information may contain feedback mode (reporting or feedback mode) information. The feedback mode information may be information that is generated by the UE and indicates the type of feedback information to be reported to the eNB. That is, for notification of the feedback mode information, the UE generates two PMIs including $i_1$ and $i_2$ and the CQI that define optimal ranks, precoding matrixes, and the like for SU-MIMO and MU-MIMO based on CSI-RS-1 and CSI-RS-2 and reports the generated PMIs and CQI to the eNB. In addition, the feedback mode information may contain content indicating whether each of $i_2$ and the CQI should be reported as sub-band-specific information or wideband information.

The eNB configuration information may contain PMI codebook information. The PMI codebook information refers to information on a set of precoding matrixes in the codebook that can be used in the current channel status. When the PMI codebook information is not contained in RRC information for feedback, the UE may recognize that all available precoding matrixes within a predetermined codebook can be used for feedback.

Other information (etc.) in the eNB configuration information may contain a feedback period for periodic feedback, offset information, interference measurement resource information, or the like.

The eNB may receive feedback information from the UE at corresponding feedback timing defined by the eNB configuration information transmitted to the UE and determine a channel status with the UE. The eNB may determine a transmission method based on the received feedback information.

According to another embodiment, the eNB may transmit configuration information of a CSI-RS for measuring a channel to the UE. The configuration information may contain at least one of the number of ports for each CSI-RS, timing and a resource location at which each CSI-RS is transmitted, and transmission power information. The eNB may transmit feedback configuration information based on one or more CSI-RSs to the UE.

The eNB transmits the CSI-RSs to the UE. In this case, the UE may estimate an antenna-port-specific channel and estimate an additional channel for virtual resources based thereon. The UE may determine feedback, generate a PMI, an RI, a CQI, and the like corresponding to the feedback, and report the generated PMI, RI, and CQI to the eNB. The eNB may receive feedback information from the UE at predetermined timing and use the received feedback information for determining the channel status with the UE.

Figure 10:
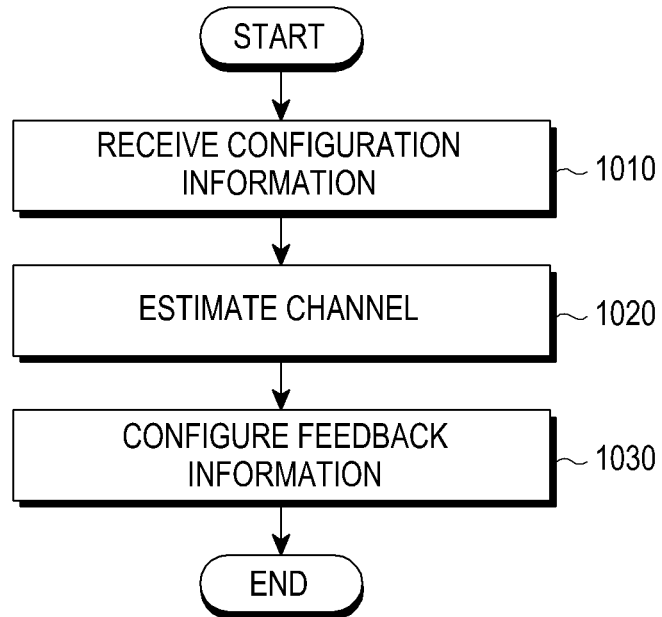
FIG. 10 illustrates a control flow occurring in the UE according to various embodiments proposed by the present disclosure.

FIG. 10 illustrates a control flow occurring in the UE according to various embodiments proposed by the present disclosure.

Referring to FIG. 10, the UE may receive configuration information from the eNB in step 1010. The UE may perform channel estimation based on a reference signal (CSI-RS or the like) received from the eNB in step 1020. The UE may configure feedback information based on information attributable to the channel estimation in step 1030 and transmit the configured feedback information to the eNB at timing determined by the configuration information. In this case, the UE may transmit or receive a signal to or from the eNB through a transmission method determined by the eNB at least based on the feedback information.

According to an embodiment, the UE may receive eNB configuration information from the eNB and perform channel estimation based on the received eNB configuration information. The eNB configuration information may be configured as [Table 1] above.

In this case, the UE may identify some or all of the number of ports for CSI-RSs, timing and a resource location at which each CSI-RS is transmitted, sequence information, and $P_c$ information based on CSI-RS configuration information (CSI-RS setting) contained in the eNB configuration information. The UE may use the $P_c$ information ($P_c$ value defined in 7.2.5 of 3GPP LTE standard TS.36.213) for calculating an accurate CQI for the PDSCH.

The UE may determine the type of feedback information to be reported to the eNB based on feedback mode (reporting or feedback mode) information contained in the eNB configuration information. That is, the UE may generate two PMIs including $i_1$ and $i_2$ and the CQI that define optimal ranks, precoding matrixes, and the like for SU-MIMO and MU-MIMO using CSI-RS-1 and CSI-RS-2 based on the feedback mode information and report the generated PMIs and CQI to the eNB. The UE may determine whether to report each of $i_2$ and the CQI as sub-band-specific information or wideband information based on the feedback mode information.

The UE may acquire PMI code information contained in the eNB configuration information, which corresponds to information on a set of precoding matrixes that can be used in the current channel status. When the PMI codebook information is not contained in RRC information for feedback, the UE may use all precoding matrixes within a predefined codebook for the feedback.

As other information (etc.), the UE may acquire a feedback period for periodic feedback, offset information, interference measurement resource information, or the like from the eNB configuration information.

The UE generates the CQI based on the result of the channel estimation. The UE may generate, for example, an SU-MIMO-based CQI (SU-CQI) and an MU-MIMO-based CQI (MU-CQI).

Through comparison between the SU-CQI and the MU-CQI, the UE may determine that SU-MIMO transmission is preferred when the difference therebetween is greater than or equal to a preset reference value ($\gamma'$), and that MU-MIMO transmission is preferred when the difference is smaller than the preset reference value. When the difference between the SU-CQI and the MU-CQI is equal to the preset reference value, the UE may determine that MU-MIMO transmission is preferred.

When the rank is higher than or equal to 2, the UE may compare the SU-CQI and the MU-CQI based on the sum of CQIS calculated for each codeword.

The UE may generate SU/MU indicator information, a feedback information rank, a PMI, and a CQI based on previously identified channel information. The UE transmits the feedback information to the eNB at corresponding feedback timing according to feedback settings of the eNB and finishes the channel feedback generation and report process considering a two-dimensional array.

A detailed description of the generation of the SU-CQI and the MU-CQI and configuration of the feedback information based on the generated SU-CQI and MU-CQI will be described below.

According to another embodiment, the UE may receive configuration information of CSR-RS configuration from the eNB. The UE may identify at least one of the number of ports for each CSI-RS, a timing at and a resource location from which each CSI-RS is transmitted, and transmission power information based on the received configuration information. The UE configures one piece of feedback configuration information based on one or more CSI-RSs.

When receiving the CSI-RSs, the UE may estimate channels between a plurality of transmission antennas of the eNB and a plurality of reception antennas of the UE based on the received CSI-RSs. The UE may generate feedback information based on a rank, a PMI, and a CQI using the received feedback configuration and a predefined codebook based on the estimated channels and a virtual channel added between the CSI-RSs. The UE transmits the feedback information to the eNB at a feedback timing determined by feedback settings of the eNB and finishes the channel feedback generation and report process considering a two-dimensional array.

According to an embodiment proposed by the present disclosure, the method by which the eNB selectively applies an SU-MIMO mode and an MU-MIMO mode corresponding to multiple transmission modes for the UE will be described in detail.

To this end, the UE should be able to estimate a CQI corresponding to each of the SU-MIMO mode and the MU-MIMO mode. Hereinafter, the CQI corresponding to the SU-MIMO mode is referred to as an "SU-CQI" and the CQI corresponding to the MU-MIMO mode is referred to as an "MU-CQI".

The UE may determine multiple transmission modes suitable for the UE itself based on the estimated SU-CQI and MU-CQI and transmit feedback on identification information indicating the determined multiple transmission modes to the eNB. To this end, a method of newly defining the identification information indicating the multiple transmission modes and transmitting feedback on the newly defined identification information to the eNB is necessary.

Figure 11:
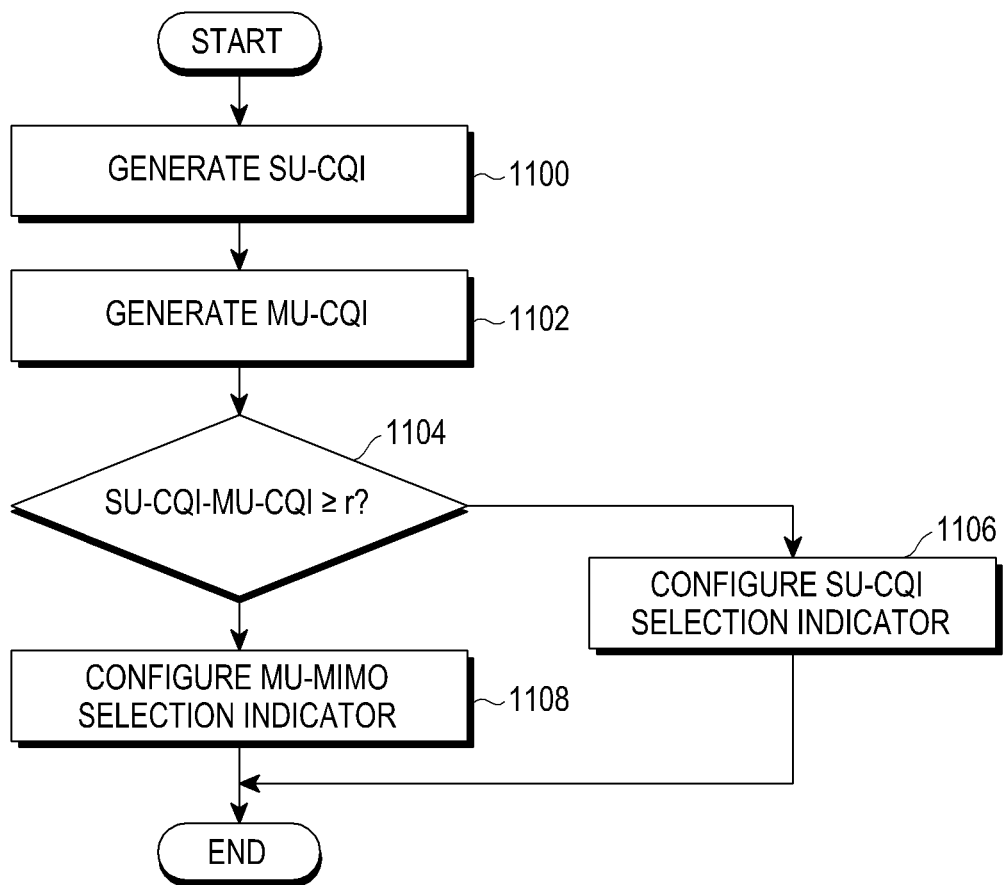
FIG. 11 illustrates a control flow in which the UE determines identification information indicating multiple transmission modes in the FD-MIMO system according to various embodiments proposed by the present disclosure.

FIG. 11 illustrates a control flow in which the UE determines identification information indicating multiple transmission modes in the FD-MIMO system according to various embodiments proposed by the present disclosure.

Referring to FIG. 11, the UE may generate an SU-CQI in step 1100. For example, the UE may measure a Signal-to-Interference-plus-Noise Ratio (SINR) ($\rho^{SU}$) based on an optimal PMI in the SU-MIMO mode and generate an SU-CQI ($CQI^{SU}$) based on the measured SINR.

Equation (1) below defines an example of converting an SINR ($\rho_k^{SU}$) measured by a $k^{th}$ UE into an SU-CQI ($CQI_k^{SU}$).

$$\rho_k^{SU} \rightarrow CQI_k^{SU} \qquad \text{Equation (1)}$$

It is assumed that $\rho_k^{SU}$ defined by Equation (1) above is measured without consideration of interference (multi-user interference) due to MU-MIMO.

The UE may generate an MU-CQI in step 1102. For example, the UE may measure an SINR ($\rho^{MU}$) based on an optimal PMI in the MU-MIMO mode and generate an MU-CQI ($CQI^{MU}$) based on the measured SINR.

Equation (2) below defines an example of converting an SINR ($\rho_k^{MU}$) measured by a $k^{th}$ UE into an MU-CQI ($CQI_k^{MU}$).

$$\rho_k^{MU} \rightarrow CQI_k^{MU} \qquad \text{Equation (2)}$$

It is assumed that $\rho_k^{MU}$ defined by Equation (2) above is measured in consideration of multi-user interference.

For example, when measuring the SINR considering multi-user interference, the UE may assume an environment in which two UEs are simultaneously scheduled and may induce the SINR based on the assumption. However, in the acquisition of the MU-CQI through Equation (2) above, there is no limitation on the number of UEs that are scheduled at the same time. When multiple UEs are simultaneously scheduled, the most preferable MU-CQI may be selected.

In order to generate the MU-CQI, the UE is required to measure multi-user interference. For example, the UE may measure multi-user interference through an IMR. However, the UE does not necessarily have to use the IMR to measure multi-user interference.

According to an embodiment, the UE may measure strengths of signals received through one or a plurality of REs corresponding to the IMR set by the eNB and determine the strength of multi-user interference based on the measured signal strengths. The IMR may be configured by the eNB for a particular UE based on an arrangement attributable to Radio Resource Control (RRC). The IMR configuration is the same as that described with reference to FIGS. 3 and 4.

[Table 2] below shows RRC fields for a certain UE.

TABLE 2

```
-- ASN1START
CSI-Process-r11 ::=        SEQUENCE {
    csi-ProcessId-r11          CSI-ProcessId-r11,
    csi-RS-ConfigNZPId-r11     CSI-RS-ConfigNZPId-r11,
    csi-IM-ConfigID-r11        CSI-IM-ConfigId-r11,
    p-C-AndCBSRList-r11 SEQUENCE (SIZE (1..2)) OF P-C-
    AndCBSR-r11,
    cqi-ReportBothProc-r11     CQI-ReportBothProc-r11 OPTIONAL, --
                               Need OR
    cqi-ReportPeriodicProcId-r11   INTEGER (0..maxCQI-ProcExt-
r11) OPTIONAL, -- Need OR
    cqi-ReportAperiodicProc-r11    CQI-ReportAperiodicProc-r11
OPTIONAL, -- Need OR
    ...
}
P-C-AndCBSR-r11 ::= SEQUENCE {
    p-C-r11                    INTEGER (-8..15),
    codebookSubsetRestriction-r11 BIT STRING
}
-- ASN1STOP
```

RRC fields shown in [Table 2] above may include a CSI-process field (CSI-ProcessId-r11 field) and an IMR configuration field (CSI-IM-ConfigId-r11 field) set by the eNB for a certain UE.

In [Table 2] above, information indicating a CSI-process, which the eNB allocates to the UE, may be recorded in the CSI-process field (CSI-ProcessId-r11 field) and information on the IMRs, which the eNB sets for a certain UE, may be recorded in the IMR configuration field (CSI-IM-ConfigId-r11 field).

[Table 3] below shows an example of the configuration of the IMR configuration field (CSI-IM-Config field).

TABLE 3

| CSI-IM-Config field |
|---|
| Resource Config |
| Subframe Config |

In [Table 3] above, the resource configuration included in the IMR configuration field (CSI-IM-Config field) may be defined by, for example, a parameter having a value from 0 to 9 in a frequency-division system and a value from 0 to 9 and from 20 to 25 in a time-division system. At this time, the values defining the resource configuration may indicate locations (A to J) of the IMRs within a subframe. The Subframe config corresponds to a parameter having a value from 0 to 154, and the period of the IMRs and a subframe offset may be configured according to each value.

As described above, the eNB may set the IMRs to be located at periodic positions. For example, in the case of transmission modes 1-9, the eNB may measure one or three multi-user interference (MU-MIMO interference) assumptions through one or a plurality of IMRs based on one CSI-process. In the case of transmission mode 10, the eNB may measure one or three multi-user interferences through one or a plurality of IMRs based on a plurality of CSI-processes.

In the above-described case, the UE may measure one interference situation through one IMR. Accordingly, the eNB may receive a report on channel status information for one or three interference situations depending on the transmission mode of the UE.

For example, the eNB may set two CSI-processes having different rank limitations. The eNB may configure each IMR to measure multi-user interference. In this case, a rank of one CSI-process may be limited to 1 or 2, and a rank of the other CSI-process may not be limited. The one CSI-process having the rank limitation may be used for receiving feedback on channel status information (MU-CQI) for MU-MIMO.

However, through the IMRs, other types of interference such as inter-cell interference as well as multi-user interference may be measured. Accordingly, in order to accurately measure only the multi-user interference, an additional limitation on the use of IMRs may be needed in order to measure only the multi-user interference in a particular time-frequency window.

In the above-description, it is assumed that the SU-CQI and the MU-CQI are generated based on the assumption of single-rank transmission. However, the SU-CQI and the MU-CQI may be generated in multi-rank transmission.

According to an embodiment, when the rank is higher than or equal to 2, the UE may generate the SU-CQI and the MU-CQI based on a sum of CQIs calculated for each codeword.

Equation (3) below defines an example of generating an SU-CQI ($CQI_k^{SU}$) and an MU-CQI ($CQI_k^{MU}$) by a $k^{th}$ UE in multi-rank transmission.

$$CQI_k^{SU}=CQI_k^{SU}(1)+CQI_k^{SU}(2),$$

$$CQI_k^{MU}=CQI_k^{MU}(1)+CQI_k^{MU}(2) \quad \text{Equation (3)}$$

Based on Equation (3) above, the SU-CQI ($CQI_k^{SU}$) may be defined by a sum of SU-CQIs calculated for each codeword and the MU-CQI ($CQI_k^{MU}$) may be defined by a sum of MU-CQIs calculated for each codeword.

The UE may determine whether SU transmission is suitable for the current channel environment or whether MU transmission is suitable for the current channel environment based on the previously generated SU-CQI and MU-CQI in step 1104.

For example, Equation (4) defines an example of determining whether SU transmission or MU transmission is suitable based on the SU-CQI and the MU-CQI.

$$CQI_k^{SU}-CQI_k^{MU} \geq \gamma \quad \text{Equation (4)}$$

In Equation (4), γ denotes an offset value preset to determine multiple transmission modes.

Based on Equation (4) above, the UE may compare a difference ($CQI_k^{SU}-CQI_k^{MU}$) between the SU-CQI and the MU-CQI with the preset offset value. The UE may determine whether the difference between the SU-CQI and the MU-CQI is greater than or equal to the preset offset value. A difference between the SU-CQI and the MU-CQI that is greater than or equal to the preset offset value may refer to the situation in which the MU-CQI is very low. The very low MU-CQI may mean that the current channel environment is not suitable for transmission in the MU-MIMO mode.

Accordingly, when the difference between the SU-CQI and the MU-CQI is greater than or equal to the preset offset value, the UE may determine that SU transmission (SU-MIMO mode) is suitable for the current channel environment. When the difference between the SU-CQI and the MU-CQI is smaller than the preset offset value, the UE may determine that MU transmission (MU-MIMO mode) is suitable for the current channel environment.

When it is determined that SU transmission (SU-MIMO mode) is suitable, the UE may set identification information indicating multiple transmission modes as an indicator indicating SU transmission (SU-MIMO mode) in step 1106. When it is determined that MU transmission (MU-MIMO mode) is suitable, the UE may set identification information indicating multiple transmission modes as an indicator indicating MU transmission (MU-MIMO mode) in step 1108.

For example, when the MU-CQI is calculated based on the assumption of the environment in which two UEs are simultaneously scheduled, the MU-CQI has a value 3 dB lower than that of the SU-CQI in terms of transmission power. In this case, since γ may set as a value greater than 2, a CQI index interval may be designed to be 2 dB in a CQI table.

In Equation (4), the configuration of the offset value may vary depending on the network operation. In Equation (4), the CQI may be defined based on a CQI index defined in 3GPP LTE standard TS.36.213. However, the CQI may be replaced with an SINR, a maximum error correction coding rate and modulation scheme, and a data efficiency per frequency which can be used in a manner similar to a maximum data transmission rate. In Equation (4), the sizes of the SU-CQI and the MU-CQI are compared with each other by subtracting the MU-CQI from the SU-CQI. However, the method of comparing the SU-CQI and the MU-CQI is not limited to that defined by Equation (4).

Hereinafter, a method of expressing and feeding back an SU/MU Indicator (SMI) indicating multiple transmission modes (one of the SU-MIMO mode and the MU-MIMO mode) selected based on the SU-CQI and the MU-CQI will be described.

According to an embodiment, the SU/MU indicator may be expressed using 1 bit. For example, when the condition defined in Equation (4) is satisfied, the UE may set the SU/MU indicator as 0 in order to indicate that transmission according to the SU-MIMO is suitable. When the condition defined Equation (4) is not satisfied, the UE may set the SU/MU indicator as 1 in order to indicate that transmission according to the MU-MIMO mode is suitable. Unlike the previous propose, the SU/MU indicator can also be set. That is, 1 may be used as the SU/MU indicator that prefers the SU-MIMO mode and 0 may be used as the SU/MU indicator that prefers the MU-MIMO mode.

In general, the UE may perform feedback based on one of four feedback modes (or reporting modes) defined below in consideration of the type of periodically fed back information.

1. Reporting mode 1-0: RI, wideband CQI (wCQI)
2. Reporting mode 1-1: RI, wCQI, PMI
3. Reporting mode 2-0: RI, wCQI, sub-band CQI (sCQI)
4. Reporting mode 2-1: RI, wCQI, sCQI, PMI Feedback timing of information on each of the four feedback modes may be determined by values of $N_{pd}$, $N_{OFFSET, CQI}$, $M_{RI}$, $N_{OFFSET, RI}$, and the like, transmitted through a higher-layer signal. In feedback mode 1-0, a transmission period of the wCQI corresponds to $N_{pd}$ subframes, and feedback timing is determined with a subframe offset value of $N_{OFFSET, CQI}$. Further, a transmission period of the RI corresponds to $N_{pd} \cdot M_{RI}$ subframes, and an offset corresponds to $N_{OFFSET, CQI} + N_{OFFSET, RI}$.

According to various embodiments proposed by the present disclosure, a method of feeding back the SU/MU indicator may be divided as follows according to a CQI feedback method.

1. The case of feedback based on the wideband-CQI (wCQI)
2. The case of feedback based on the sub-band-CQI (sCQI)
3. The case of feedback separately for the wCQI and the sCQI In consideration of the above division, a scenario of feeding back the SU/MU indicator based on the wCQI and a scenario of feeding back the SU/MU indicator based on the sCQI will be described prior to describing the method of feeding back the SU/MU indicator.

In consideration of the above-described conditions, the scenario of feeding back the SU/MU indicator based on the wCQI may be applied to all of the four defined feedback modes, and the scenario of feeding back the SU/MU indicator based on the sCQI may be applied to feedback modes 2-0 and 2-1 of the four defined feedback modes. Further, a scenario of feeding back the SU/MU indicator separately for the wCQI and the sCQI may be applied to feedback modes 2-0 and 2-1, among the four defined feedback modes.

Figure 12:
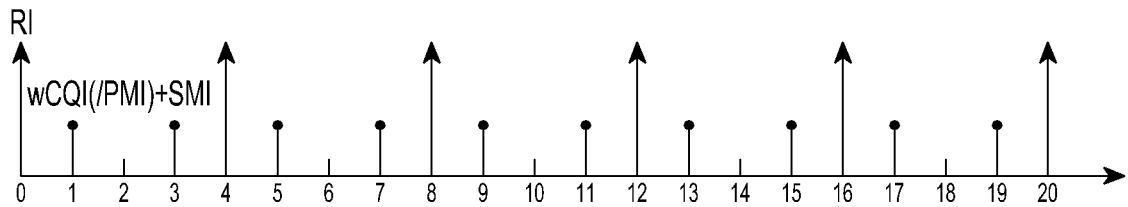
FIG. 12 illustrates a scenario in which the UE feeds back the SU/MU indicator based on the wCQI in the FD-MIMO system according to various embodiments proposed by the present disclosure.

FIG. 12 illustrates a scenario in which the UE feeds back the SU/MU indicator based on the wCQI in the FD-MIMO system according to various embodiments proposed by the present disclosure.

Referring to FIG. 12, the UE may report a one-bit SU/MU indicator (SMI) to the eNB whenever the wCQI is fed back. When the SU/MU indicator (SMI) indicates that SU-MIMO is preferred, it may be assumed that the sCQI also prefers the SU-MIMO mode. When the SU/MU indicator (SMI) indicates that MU-MIMO is preferred, it may be assumed that the sCQI also prefers the MU-MIMO mode.

According to an embodiment, the scenario may be applied to feedback modes 1-0 and 1-1 of the four feedback modes based on the assumption of $N_{pd}=2$, $N_{OFFSET, CQI}=1$, $M_{RI}=2$, and $N_{OFFSET, RI}=-1$. In this case, feedback timing may be defined for the RI and the wCQI. At this time, timing (0 to 20) indicates subframe indexes.

Feedback mode 1-1 has feedback timing that is the same as that of feedback mode 1-0. That is, feedback mode 1-0 and feedback mode 1-1 have the same timing at which the wCQI is transmitted, which corresponds to the timing at which the SU/MU Indicator (SMI) is transmitted. However, the feedback timing defined for feedback mode 1-1 may be distinguished from the feedback timing defined for feedback mode 1-0 in that the PMI is also transmitted at a timing at which the wCQI is transmitted in the case of one antenna port, two antenna ports, or four antenna ports.

Although the scenario of feeding back the SU/MU indicator based on the wCQI is applied to feedback modes 1-0 and 1-1 in FIG. 12, the scenario may be also applied to feedback mode 2-0 or 2-1.

More specifically, in feedback mode 2-0, a feedback period for the sCQI corresponds to $N_{pd}$, an offset value for the sCQI corresponds to $N_{OFFSET, CQI}$, a feedback period for the wCQI is $H \cdot N_{pd}$ subframes, and an offset value for the wCQI corresponds to $N_{OFFSET, RI}$. That is, in feedback mode 2-0, it may be noted that the offset values are the same or that the feedback periods are different. H may be defined as $J \cdot K+1$. In this case, K is transmitted through a higher-layer signal, and J is a value which may be determined according to a system bandwidth. For example, J for a system of 10 MHz may be defined as 3. As a result, since the wCQI may be transmitted once instead of the sCQI after the sCQI is transmitted H times, the SU/MU indicator may also be transmitted along with the wCQI once in every transmission of H sCQI transmissions. In this case, the period of the RI corresponds to $M_{RI} \cdot H \cdot N_{pd}$ subframes and the offset corresponds to $N_{OFFSET, CQI} + N_{OFFSET, RI}$.

Figure 13:
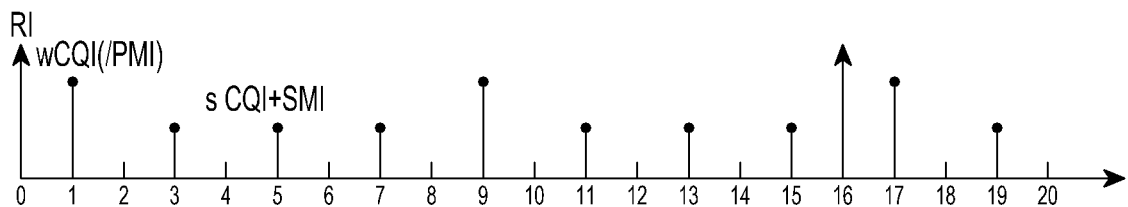
FIG. 13 illustrates a scenario in which the UE feeds back the SU/MU indicator based on the sCQI in the FD-MIMO system according to various embodiments proposed by the present disclosure.

FIG. 13 illustrates a scenario in which the UE feeds back the SU/MU indicator based on the sCQI in the FD-MIMO system according to various embodiments proposed by the present disclosure.

Referring to FIG. 13, the UE may report a one-bit SU/MU Indicator (SMI) to the eNB whenever the sCQI is fed back. At this time, it may be assumed that the wCQI is always in the SU-MIMO mode.

According to an embodiment, it is assumed that $N_{pd}=2$, $M_{RI}=2$, $J=3$(10 MHz), $K=1$, $N_{OFFSET, CQI}=1$, and $N_{OFFSET, RI}=-1$. In this case, feedback timing may be defined for the RI, the sCQI, and the wCQI.

Feedback mode 2-1 has feedback timing that is the same as that of feedback mode 2-0. That is, feedback mode 2-0 and feedback mode 2-1 have the same timing at which the sCQI is transmitted, which corresponds to the timing at which the SU/MU Indicator (SMI) is transmitted. However, the feedback timing defined for feedback mode 2-1 may be distinguished from the feedback timing defined for feedback mode 2-0 in that the PMI is also transmitted at a timing at which the wCQI is transmitted in the situation of one antenna port, two antenna ports, or four antenna ports.

In FIG. 13, the scenario of feeding back the SU/MU indicator based on the sCQI in some cases in which the number of CSI-RS antenna ports is 1, 2, or 4 is illustrated. However, the scenario of feeding back the SU/MU indicator based on the sCQI can be applied even when CSI-RSs for four antenna 4 antenna ports or 8 antenna ports are allocated.

More specifically, the UE receiving the CSI-RSs for 4 antenna ports or 8 antenna ports may feed back two pieces of PMI information.

Figure 14:
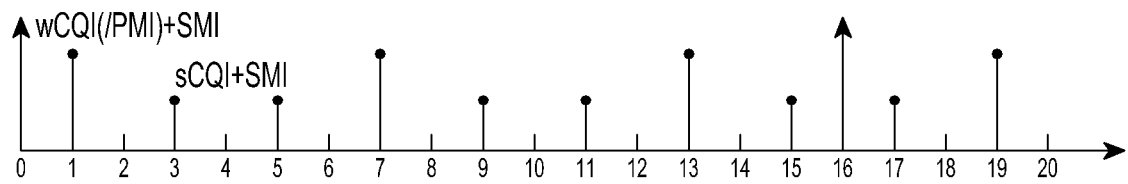
FIG. 14 illustrates a scenario in which the UE feeds back the SU/MU indicator for each of the wCQI and the sCQI in the FD-MIMO system according to various embodiments proposed by the present disclosure.

FIG. 14 illustrates a scenario in which the UE feeds back the SU/MU indicator for each of the wCQI and the sCQI in the FD-MIMO system according to various embodiments proposed by the present disclosure.

Referring to FIG. 14, a first SMI may be fed back at a time point at which the wCQI is transmitted, and a second SMI may be fed back at a time point at which the sCQI is transmitted.

For example, when the UE receives CSI-RSs having 4 antenna ports or 8 antenna ports, feedback mode 1-1 may be subdivided into two sub modes.

In this case, in the first sub mode, the RI may be transmitted along with first PMI information, and second PMI information may be transmitted along with the wCQI. Here, a feedback period and an offset for the wCQI and the second PMI may be defined as $N_{pd}$ and $N_{OFFSET, CQI}$, and a feedback period and an offset for the RI and the first PMI information may be defined as $M_{RI} \cdot N_{pd}$ and $N_{OFFSET, CQI} + N_{OFFSET, RI}$.

When the UE reports both the first PMI ($i_1$) and the second PMI ($i_2$) to the eNB, the UE and the eNB may identify that a precoding matrix $W(i_1,i_2)$ corresponding to a combination of the first PMI and the second PMI within a set (codebook) of precoding matrixes shared therebetween is a precoding matrix that the UE prefers.

Alternatively, when a precoding matrix corresponding to the first PMI is $W_1$ and a precoding matrix corresponding to the second PMI is $W_2$, the UE and the eNB may share information indicating that the precoding matrix that the UE prefers is determined as $W_1 W_2$, which is a product of the two matrixes.

When the feedback mode for 8 CSI-RS antenna ports is feedback mode 2-1, feedback on Precoding Type Indicator (PTI) information may be added to the feedback information. At this time, the PTI is fed back along with the RI, a period thereof corresponds to $M_{RI} \cdot H \cdot N_{pd}$ subframes, and an offset is defined as $N_{OFFSET, CQI} + N_{OFFSET, RI}$.

Specifically, when the PTI is 0, all of the first PMI, the second PMI, and the wCQI may be fed back. At this time, the wCQI and the second PMI are transmitted at the same timing, the period thereof corresponds to $N_{pd}$, and the offset is $N_{OFFSET, CQI}$. The period of the first PMI is $H \cdot N_{pd}$, and the offset is $N_{OFFSET, CQI}$. Here, H' is transmitted through a higher-layer signal.

When the PTI is 1, the wCQI is transmitted along with the second PMI, and the sCQI is fed back along with the sub-band second PMI at a separate timing. At this time, the first PMI is not transmitted, and the second PMI and the CQI are calculated and then reported based on the assumption of the most recently reported first PMI when the PTI is 0. In this case, the period and the offset of the PTI and the RI are the same as those in the case in which the PTI is 0. The period of the sCQI may be defined as $N_{pd}$ subframes and the offset may be defined as $N_{OFFSET, CQI}$. The wCQI and the second PMI may be fed back with the period of $H \cdot N_{pd}$ and the offset of $N_{OFFSET, CQI}$. In this case, H may be defined to be the same as that in the case in which the number of CSI-RS antenna ports is 2.

Further, according to an embodiment, the scenario of feeding back the SU/MU indicator may be applied to aperiodic feedback of the UE. When the eNB desires to acquire aperiodic feedback information of a particular UE, the eNB may perform uplink data scheduling of the corresponding UE by configuring an aperiodic feedback indicator included in Downlink Control Information (CDI) for uplink data scheduling of the corresponding UE to perform particular aperiodic feedback.

When receiving the indicator configured to perform the aperiodic feedback in an $n^{th}$ subframe, the corresponding UE performs uplink transmission including aperiodic feedback information in data transmission in an n+k$^{th}$ subframe. Here, k may be 4 in Frequency-Division Duplexing (FDD).

[Table 4] below defines k corresponding to each subframe in Time-Division Duplexing (TDD).

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

[Table 4] above defines k for a number n of each subframe in a TDD/UL/DL arrangement.

When the aperiodic feedback is configured, feedback information may contain the RI, the PMI, the CQI, and the SMI, like the case of periodic feedback. The RI and the PMI may not be fed back according to feedback settings. The CQI may contain both the wCQI and the sCQI or only the wCQI.

In the following embodiment, a method of using the SU/MU Indicator (SMI) will be described. A method by which the eNB operates SU-MIMO or MU-MIMO through the SMI may be divided as follows according to the definition of CSI.

1. Operation based on CSI (RI, PMI, or CQI) for SU-MIMO defined in the current LTE/LTE-A standard
2. Case in which the CSI for MU-MIMO is defined in the future LTE standard First, in the case of operation based on CSI (RI, PMI, or CQI) information, the UE may measure the SU-CQI and the MU-CQI based on Equation (1) and Equation (2) or Equation (3) above. Based on a result thereof, the UE determines whether SU-MIMO transmission is suitable for the current channel status or whether MU-MIMO transmission is suitable for the current channel status based on Equation (4) above.

The UE may transmit feedback on the SMI to the eNB using 1 bit. At this time, the RI, the PMI, and the CQI fed back along with the SMI correspond to the CSI fed back based on the assumption of SU-MIMO transmission. Accordingly, when the 1-bit SMI indicates preference for SU-MIMO transmission, the eNB may use RI, PMI, and CQI information fed back along with the SMI. When the 1-bit SMI indicates preference for MU-MIMO transmission, the eNB regenerates the RI, the PMI, and the CQI for MU-MIMO based on the RI, the PMI, and the CQI fed back under the assumption of SU-MIMO transmission.

Second, when the CSI feedback for MU-MIMO is defined, the UE may transmit feedback on actual MU-CSI information to the eNB according to the SMI. In this case, the SU-CSI may always be fed back, and the MU-CSI may be additionally fed back according to the SMI. Further, when the SMI prefers MU-MIMO, the SU-CSI may not be fed back, and only the MU-CSI may be fed back.

An embodiment proposed by the present disclosure provides a method of generating channel status information for performing effective data transmission/reception in the LTE-A-based FD-MIMO system and sharing the generated channel status information between the eNB and UE.

To this end, the eNB prepares an operation and a procedure of generating configuration information of a plurality of CSI-RSs (hereinafter, referred to as "reference signal configuration information") to perform efficient data transmission/reception and notifying the UE of the generated reference signal configuration information. In this case, the eNB may propose a method of configuring various numbers of CSI-RSs by improving the configuration information of CSI-RSs limited to 1 (or 2), 4, or 8.

For example, the eNB may configure reference signal resources for measuring channels according to 8 or more antennas and provide the configured reference signal resources to the UE. In this case, the number of reference signals included in the reference signal resources may be different according to the configuration of antennas of the eNB and the measurement type.

Then, the UE prepares an operation and a procedure of measuring a downlink channel status based on the reference signal configuration information provided by the eNB, generating feedback information corresponding to the measured downlink channel status, and transmitting the generated feedback information to the eNB.

Figure 15:
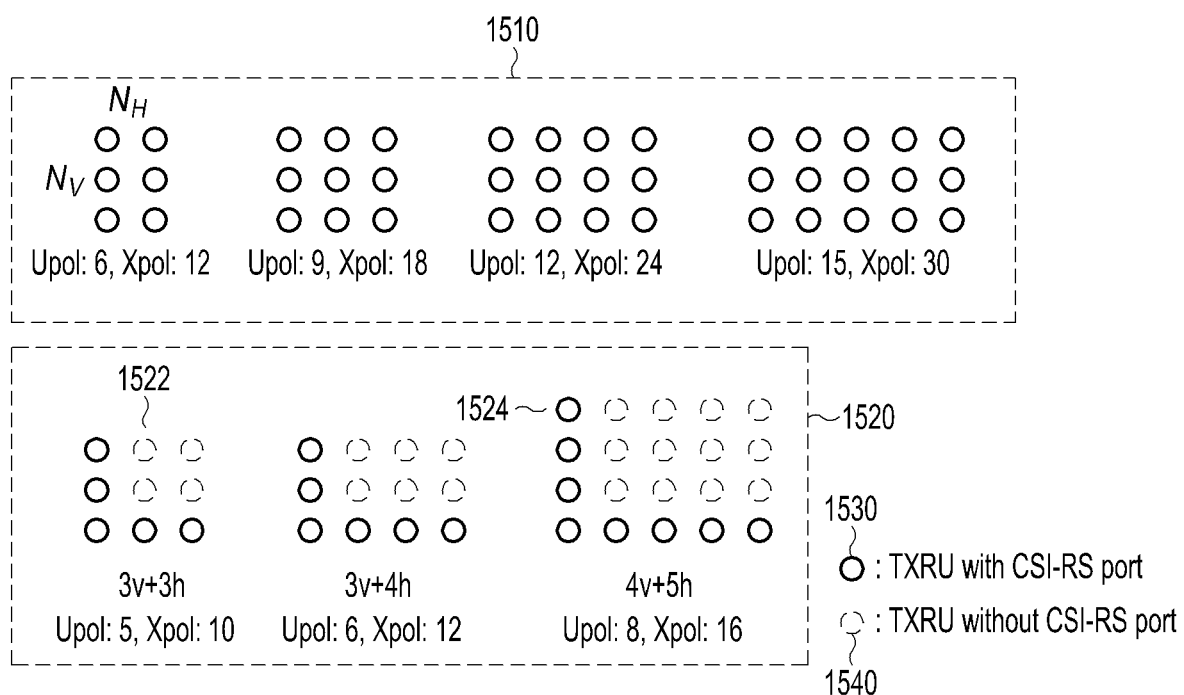
FIG. 15 illustrates an example of the configuration of CSI-RSs for configuring and measuring antennas in the massive multi-antenna system according to various embodiments of the present disclosure.

FIG. 15 illustrates an example of the configuration of CSI-RSs for configuring and measuring antennas in the massive multi-antenna system according to various embodiments of the present disclosure.

Referring to FIG. 15, the configuration of CSI-RSs may be divided into a full measurement type and a partial measurement type. The full measurement type estimates CSI-RS ports for all TXRU used for data transmission, and the partial measurement type estimates CSI-RS ports for some of TXRU used for data transmission.

The full measurement type may require various numbers of CSI-RSs according to the number $N_H$ of horizontal ports, the number $N_V$ of vertical ports, and the presence or absence of a polarization antenna, as indicated by reference numeral 1510.

In the partial measurement type, only some of all TXRU may have CSI-RS ports, as indicated by reference numeral 1520. The eNB may transmit CSI-RSs only via TXRU having CSI-RS ports. Accordingly, a first TXRU 1530 having the CSI-RS port corresponds to TXRU in which channel estimation through the CSI-RS is performed, and a second TXRU 1540 having no CSI-RS port corresponds to TXRU in which channel estimation through the CSI-RS is not performed.

Reference numeral 1522 indicates that, when partial estimation is performed using a total of 5 CSI-RSs, CSI-RSs transmitted through three horizontal CSI-RS ports may be used for determining horizontal channel direction information by the UE and CSI-RSs transmitted through three vertical CSI-RS ports may be used for determining vertical channel direction information by the UE.

Reference numeral 1524 indicates that, when an array is large-scale and cross-pol antennas are used, a large number of CSI-RSs is necessary even through partial estimation is performed.

The TXRU allocation pattern indicated by reference numeral 1520 merely corresponds to an example of puncturing the CSI-RS ports for partial measurement, and various other puncturing patterns can be applied. The partial estimation type may have a relatively large channel estimation error compared to the full estimation type, but has an advantage of saving CSI-RS resources.

As described above, a maximum of 8 CSI-RSs can be configured per eNB in the current system, so that a new CSI-RS configuration method is required to support the FD-MIMO system requesting the configuration of 8 or more CSI-RSs.

According to an embodiment, in the FD-MIMO system requesting the configuration of 8 or more CSI-RSs, a method of using a plurality of CSI-processes and a method of using one CSI-process can be implemented as the method of configuring a plurality of CSI-RSs. The method of using the plurality of CSI-processes proposes limiting the number of supported CSI-RSs and performing the CSI-process on each of the plurality of CSI-RS configurations. The method of using one CSI-process proposes limiting the number of supported CSI-RSs and performing the one CSI-process by multiplexing the plurality of CSI-RS configurations.

Figure 16:
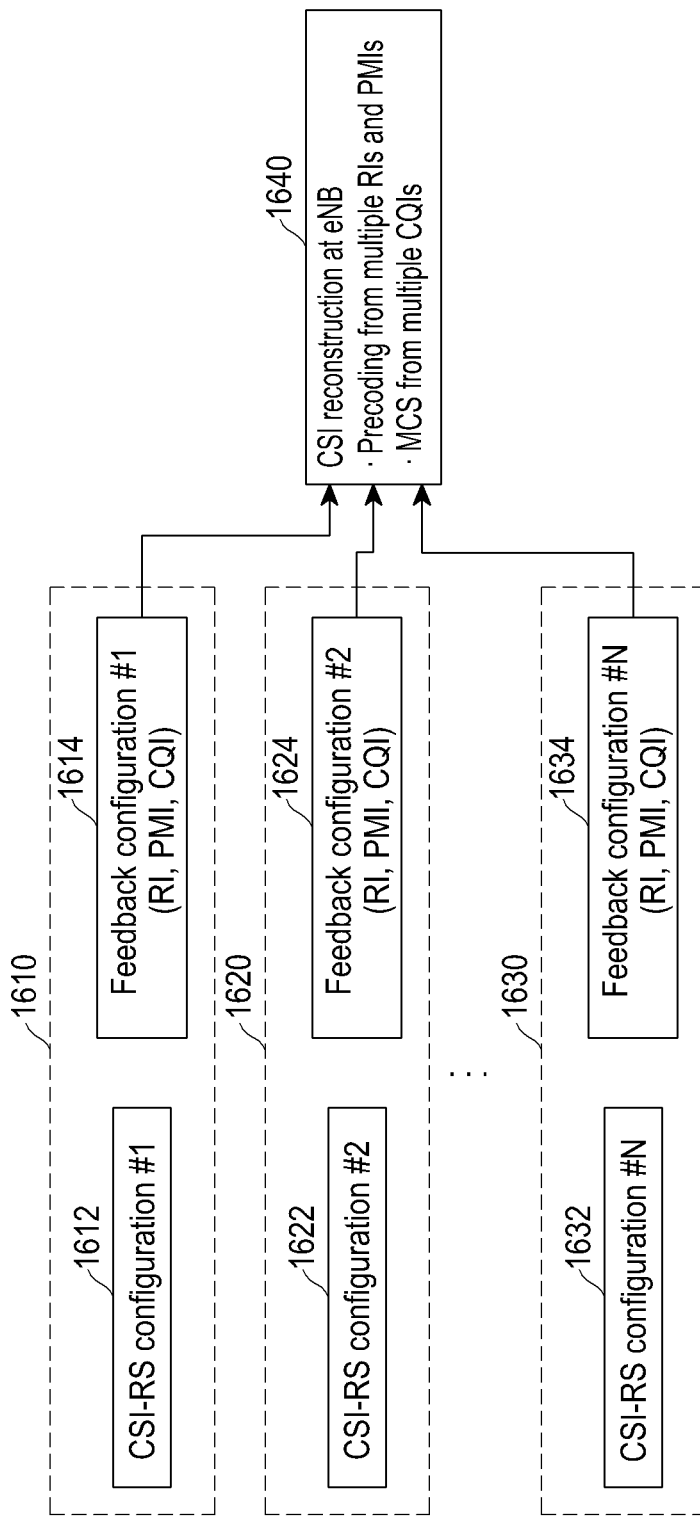
FIG. 16 illustrates an example of configuring a plurality of CSI-processes for a plurality of CSI-RS configurations in the FD-MIMO system according to an embodiment proposed by the present disclosure.

FIG. 16 illustrates an example of configuring a plurality of CSI-processes for a plurality of CSI-RS configurations in the FD-MIMO system according to an embodiment proposed by the present disclosure.

Referring to FIG. 16, the eNB may configure a plurality of CSI-processes 1610, 1620, and 1630, each of which can support a maximum of 8 CSI-RSs. In this case, the UE may perform channel estimation on many CSI-RS ports through the plurality of CSI-processes 1610, 1620, and 1630. The plurality of CSI-processes 1610, 1620, and 1630 may include steps of configuring a CSI-RS array (CSI-RS configuration #1, #2 to #N) 1612 and 1622 to 1632 and steps of configuring feedback information (feedback configuration #1, #2 to #N) 1614 and 1624 to 1634.

An RI, a PMI, and a CQI in the steps (feedback configuration #1, #2 to #N) 1614, 1624, and 1634 of configuring feedback information in the plurality of CSI-processes 1610, 1620, and 1630 may be associated with each other according to a predetermined arrangement. Accordingly, the eNB may reconstruct one final feedback information based on the acquired feedback information (RI, PMI, and CQI) corresponding to the plurality of CSI processes 1610, 1620, and 1630 as indicated by reference numeral 1640. The reconstruction of the feedback information by the eNB may determine precoding matrixes from a plurality of RIs and a plurality of PMIs acquired from the plurality of CSI processes 1610, 1620, and 1630 and determine MCSs from a plurality of CQIs acquired from the plurality of CSI processes 1610, 1620, and 1630.

For example, it may be assumed that the first CSI process 1610 indicates channel information for a horizontal direction and that the second CSI process 1620 indicates channel information for a vertical direction. In this case, the eNB may calculate a Kronecker product for a first PMI reported through the first CSI process 1610 and a second PMI reported through the second CSI process 1620 and determine the result thereof to be the precoding matrix for all channels. Further, a joint CQI may be used as the product of a first CQI reported through the first CSI process 1610 and a second CQI reported through the second CSI process 1620.

According to the above propose, there is no need to newly design the CSI-RS pattern in each of the plurality of CSI processes 1610, 1620, and 1630 for the FD-MIMO system. However, there is a need to separately report the CQIs in each of the plurality of CSI processes 1610, 1620, and 1630 or newly define the joint CQI.

Figure 17:
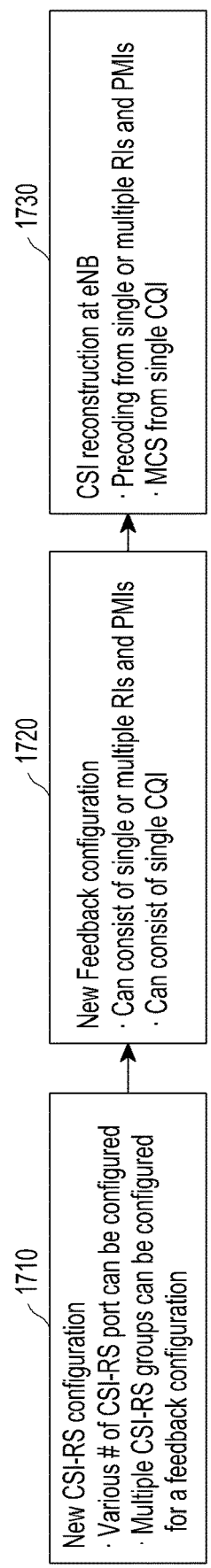
FIG. 17 illustrates an example of configuring one CSI-process for a plurality of CSI-RS configurations in the FD-MIMO system according to an embodiment proposed by the present disclosure.

FIG. 17 illustrates an example of configuring one CSI-process for a plurality of CSI-RS configurations in the FD-MIMO system according to an embodiment proposed by the present disclosure.

Referring to FIG. 17, the eNB may configure one CSI process to include a plurality of CSI-RS ports corresponding to 8 or more CSI-RS ports. In this case, the UE may perform channel estimation on the plurality of CSI-RS ports corresponding to 8 or more CSI-RS ports through one CSI process. The one CSI process may include a step (new CSI-RS configuration) 1710 of configuring a CSI-RS array, a step (new feedback configuration) 1720 of configuring feedback information, and a step (CSI reconstruction) 1730 of reconstructing feedback information.

In the step (new CSI-RS configuration) 1710 of configuring the CSI-RS array, the eNB may generate CSI-RS port configuration information through various methods such as directly indicating an RE location of each port, providing a port configuration pattern, or providing information related to the existing CSI-RS group, and transmit the generated CSI-RS port configuration information to the UE.

In the step (new feedback configuration) 1720 of configuring the feedback information, the UE may generate feedback information such as an RI, a PMI, a CQI, and the like based on the CSI-RS port configuration information received from the eNB and preset feedback configuration information. At this time, a channel rank and a channel direction may be reported by one or a plurality of RIs and PMIs based on a predetermined rule. A channel quality may be also reported through a plurality of divided CQIs.

According to the above-described propose, since a plurality of CSI-RSs is directly associated with one feedback information configuration, the channel quality can be reported through one CQI even though the joint CQI is not newly defined. However, in the step (CSI reconstruction) 1730 of reconstructing the feedback information, the UE does not have to necessarily use a single CQI but may use multiple CQIs.

According to the above-described propose, although the existing CQI can be used without the new CQI definition for the FD-MIMO system, it may be required to design a new CSI-RS pattern or a new CSI-RS configuration method.

In the following disclosure, various embodiments for a detailed CSI-RS configuration method, a channel information generation method by the UE according to the detailed CSI-RS configuration method, and a channel information report method will be proposed for the method of configuring one CSI-process proposed above.

According to an embodiment, the eNB may directly inform a certain UE of a start location and/or an end location of CSI-RS resources allocated to the certain UE.

More specifically, the eNB can notify the UE of the start location and/or the end location of CSI-RS resources based on a preset table.

[Table 5] shows an example of a predefined table to notify the UE of the start location and/or the end location of CSI-RS resources.

TABLE 5

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (6, 2) | 1 | (6, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |

TABLE 5-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In (k', l') defined in [Table 5] above, k' denotes an index indicating a sub-carrier that defines a start point of CSI-RS resources according to the CSI-RS array and l' denotes an index indicating a symbol location that defines a start point of CSI-RS resources of the CSI-RS array.

Based on the preset table corresponding to [Table 5] above, the eNB may inform a certain UE of the start location and/or the end location of CSI-RS resources allocated to the certain UE. In another example, for the UE, the eNB may inform the certain UE of the start location of allocated CSI-RS resources and the size of allocated CSI-RS resources. Accordingly, the eNB may notify the CSI-RS resource configuration in various cases to the certain UE.

Based on [Table 5] above, CSI-RS port indexes may be allocated to the CSI-RS configuration for one or two CSI-RSs from the start location of the allocated CSI-RS resources in increasing or decreasing order.

Figure 18:
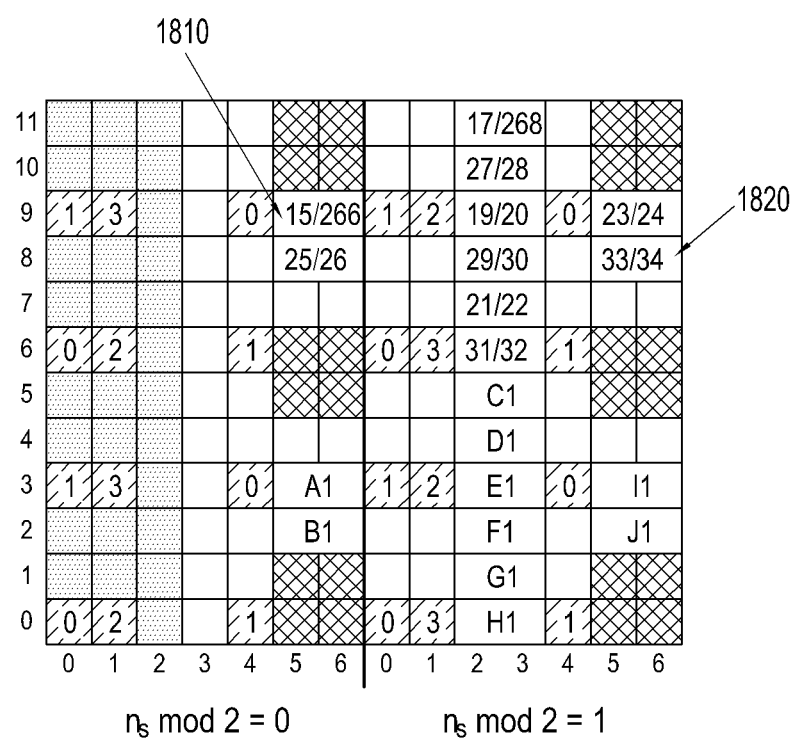
FIG. 18 illustrates an example of the CSI-RS configuration in the FD-MIMO system according to various embodiments proposed by the present disclosure.

FIG. 18 illustrates an example of the CSI-RS configuration in the FD-MIMO system according to various embodiments proposed by the present disclosure.

Referring to FIG. 18, an example of allocating CSI-RS port indexes in increasing order for the CSI-RS configuration is illustrated when the number of CSI-RS ports is 16 and <CSI-RS configuration=0, (k'=9, l'=5), n mod 2=0> is set as the start point.

Reference numeral 1810 indicates the start location of allocated CSI-RS resources and reference numeral 1820 indicates the end location of allocated CSI-RS resources calculated according to settings. Reference numeral 1820 may be directly provided to the UE, like reference numeral 1810.

According to an embodiment, for a certain UE, the eNB may inform the certain UE of the allocated CSI-RS resources through combined information thereon. The combination may be, for example, a combination of a plurality of CSI-RS configurations included in one process and the number of antenna ports corresponding to one CSI-RS configuration. The combination may define antenna ports for measuring downlink channel status by the UE.

More specifically, the UE can combine a plurality of legacy CSI-RS configurations to set various numbers of CSI-RS ports. When the eNB provides a plurality of pieces of CSI-RS configuration information to the UE in one CSI process, the eNB may instruct the UE to generate channel information by linking the plurality of pieces of CSI-RS configuration information to be provided through the one CSI process.

Figure 19:
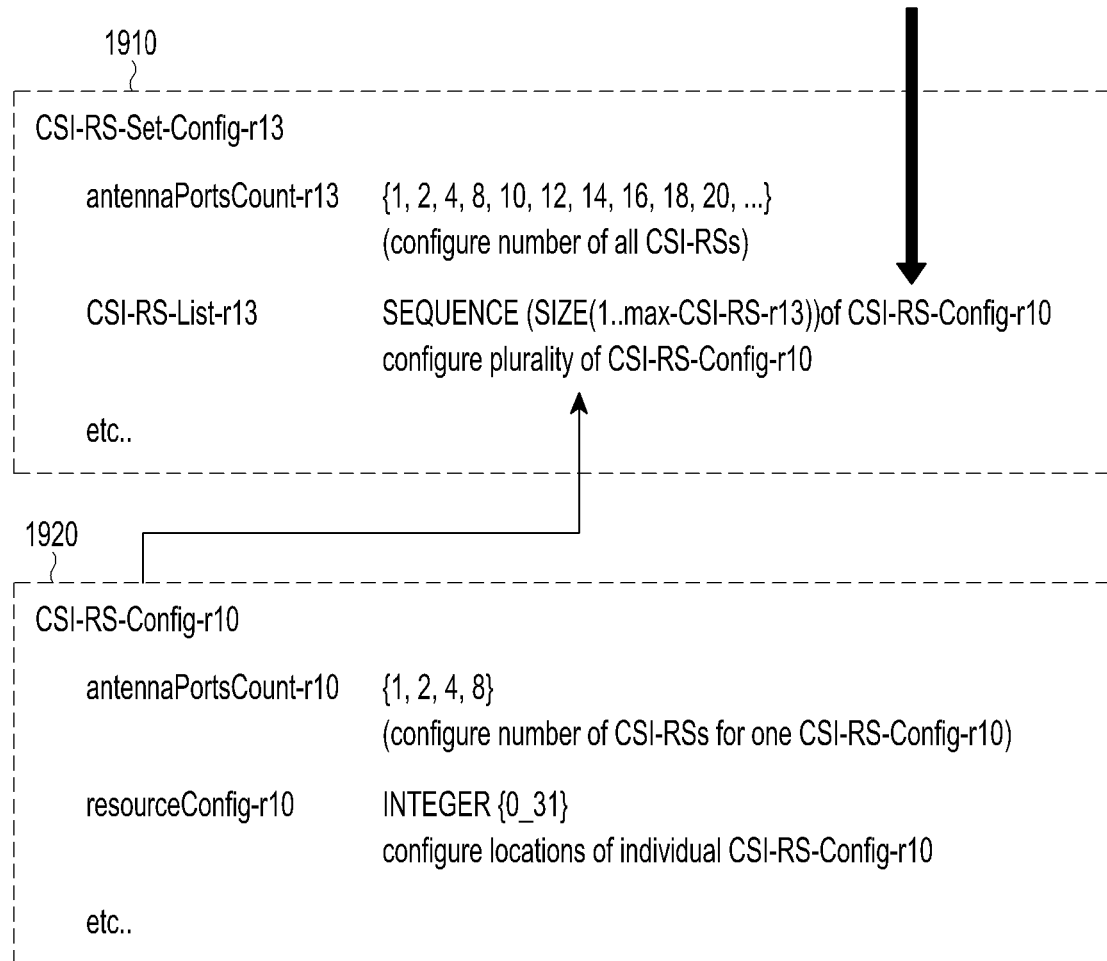
FIG. 19 illustrates an example of the configuration for linking a plurality of CSI-RS configurations with one CSI process according to various embodiments proposed by the present disclosure.

FIG. 19 illustrates an example of the configuration for linking a plurality of CSI-RS configurations with one CSI process according to various embodiments proposed by the present disclosure.

Referring to FIG. 19, the eNB can record information designating various numbers of CSI-RS ports to an antennaPortsCount-r13 field included in a CSI-RS configuration 1910. Accurate location information corresponding to each of the various numbers of CSI-RS ports recorded in the antennaPortsCount-r13 field may be defined by a plurality of legacy CSI-RS configurations 1920.

In this case, the number of all CSI-RS ports recorded in antennaPortsCount-r13 field may be the sum of the numbers of CSI-RS ports recorded in the antennaPortsCount-r10 field included in the plurality of legacy CSI-RS configurations 1920. Here, the terms referring to the CSI-RS-Set-Config-r13 field and the CSI-RS-Config-r10 field are set for convenience of description, and may be replaced with other terms according to the actual application situation.

Figure 20:
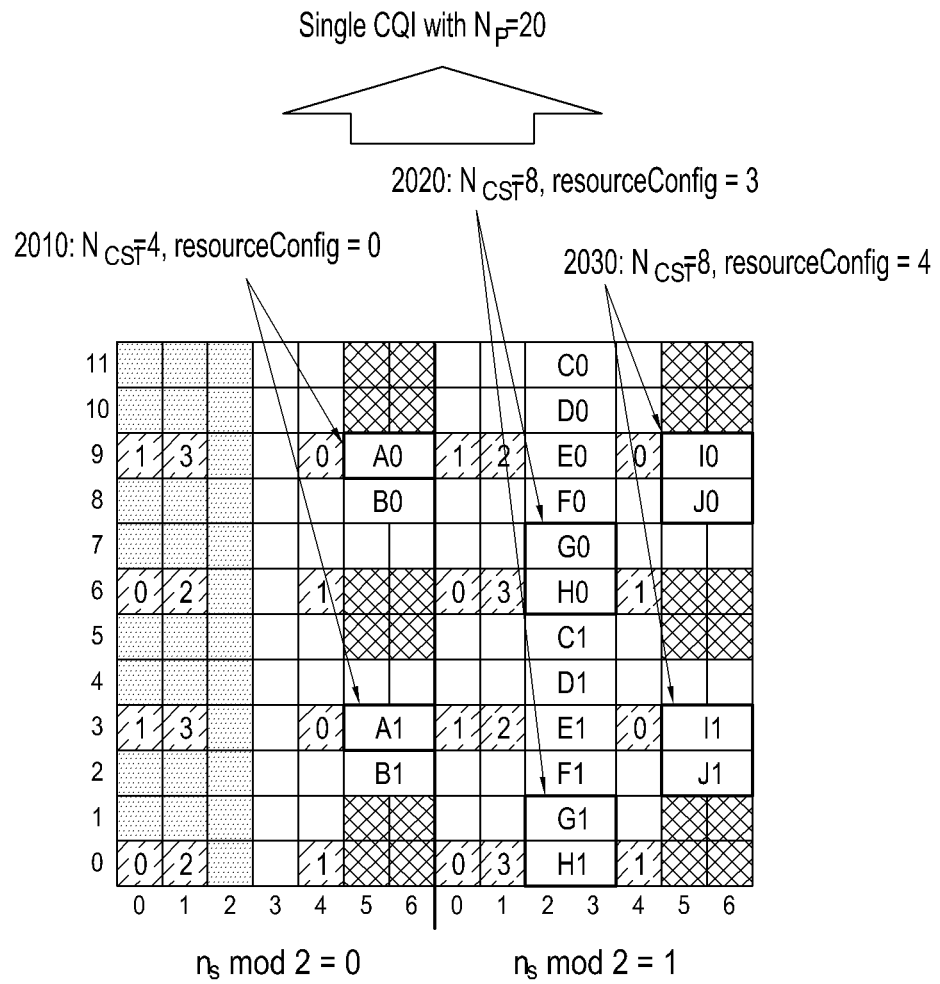
FIG. 20 illustrates an example of generating CSIs based on a plurality of CSI-RS resource locations according to various embodiments proposed by the present disclosure.

FIG. 20 illustrates an example of generating CSIs based on a plurality of CSI-RS resource locations according to various embodiments proposed by the present disclosure.

Referring to FIG. 20, when three CSI-RSs, namely <NCSI=4, resourceConfig=0>, <NCSI=8, resourceConfig=3>, and <NCSI=8, resourceConfig=4> are configured in the UE, the UE may generate CSIs based on a plurality of CSI-RS resource locations.

When resource locations shown in [Table 5] above are used, the UE may measure a channel status for 20 CSI-RS ports included in designated resources 2010, 2020, and 2030 and generate a CQI based on the result of the measurement.

For example, it may be assumed that $N_{CSI}$ denotes the number of CSI-RS ports (antennaPortCount-r10 in FIG. 19) included in each configuration and that $N_P$ denotes the number of all CSI-RS ports (antennaPortCount-r13 in FIG. 19) configured by the eNB.

As illustrated in FIGS. 19 and 20, when channel status information is generated using the plurality of CSI-RS configurations, a method of liking the CSI-RS ports included in respective CSI-RS configurations may be needed.

For example, CSI-RS port indexes may be counted in decreasing/increasing order for configuration indexes such as $N_{CSI}$, resourceConfig, and the like. That is, $N_P$ is 4 in one CSI-RS-Set-Config-r13, and it is assumed that three CSI-RS configurations are set.

[config. 0: {NCSI=4,resourceConfig=0},config. 1: {NCSI=8,resourceConfig=3},config. 2: {NCSI=4,resourceConfig=4}]

In such a situation, when CSI-RS ports arrange configuration indexes in increasing order, the UE may assume that each CSI-RS configuration includes CSI-RSs of the following indexes.

config. 0: CSI-RS ports of no. {15, 16, 17, 18}, config. 1: CSI-RS ports of no. {23, 24, 25, 26, 27, 28, 29, 30}, config. 2: CSI-RS ports of no. {19, 20, 21, 22}

Here, it is assumed that the CSI-RS port indexes start at no. 15, as in the LTE/LTE-A system.

In another example, the CSI-RS ports may be arranged in increasing/decreasing order according to the order of CSI-RS configurations. Accordingly, in the situation of the above example, the CSI-RS ports may be mapped to each CSI-RS configuration as follows.

config. 0: CSI-RS ports of no. {15, 16, 17, 18}, config. 1: CSI-RS ports of no. {19, 20, 21, 22, 23, 24, 25, 26}, config. 2: CSI-RS ports of no. {27, 28, 29, 30}

In another example, the eNB may randomly allocate the order of CSI-RS configurations to the UE. For example, when the order corresponds to config .2-config. 0-config .1, the CSI-RS ports may be mapped to each CSI-RS configuration as follows.

config. 0: CSI-RS ports of no. {19, 20, 21, 22}, config. 1: CSI-RS ports of no. {23, 24, 25, 26, 27, 28, 29, 30}, config. 2: CSI-RS ports of no. {15, 16, 17, 18}

According to various embodiments proposed by the present disclosure, it is apparent that resource locations indicated by individual CSI-RS configurations included in one CSI-RS-Set-Config-r13 must not overlap each other. However, the eNB may configure some CSI-RS resources to overlap each other under a particular intention. For example, when one or two CSI-RS resources overlap each other, the UE may determine that CSI-RS ports at corresponding locations are reference points simultaneously used for generating horizontal and vertical channel status information. The horizontal and vertical channel status information has the same meaning as first dimensional and second dimensional channel status information.

In the examples, detailed CSI-RS port locations according to individual CSI-RS configurations can be determined based on [Table 5] and Equation (5).

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{Equation (5)}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation (5), p denotes a CSI-RS port index within the individual CSI-RS configuration.

When an actual CSI-RS port index of the corresponding CSI-RS configuration is $\{p_0, p_1, \ldots, p_{N_{CQI}}\}$, p for an $n^{th}$ port of the CSI-RS configuration may be calculated by Equation (6) below.

$$p = p_n - p_0 + 15 \quad \text{Equation (6)}$$

Since the full measurement is assumed in the above examples, the CSI-RS port index sequentially increases, but the CSI-RS port index may not be limited thereto, and may discontinuously decrease in the partial measurement. This will be described later in detail.

According to an embodiment, the eNB may directly inform a certain UE of information on CSI-RS resources allocated to the certain UE based on a bitmap.

The eNB may allocate CSI-RS resources to the certain UE, configure, in the form of a bitmap, information indicating locations of the allocated CSI-RS resources within a preset unit resource allocation area, and transmit the configured bitmap to the certain UE. The preset unit resource allocation area may be defined by 12 subcarriers separating the frequency domain and 14 symbols separating the time domain.

In this case, the preset unit resource allocation area may include 168 REs. The eNB may allocate CSI-RS resources through REs at preset locations among the 168 REs. Locations (REs) that can be used as the CSI-RS resources may exist from A1 to J1, as illustrated in FIG. 20. Two REs may be mapped to each of the locations corresponding to A1 to J1.

The eNB may transmit a bitmap indicating whether resources (REs or A0 to J1) existing within the preset unit resource allocation area are allocated to the UE through higher-layer (for example, RRC layer) signaling or L1 signaling. For example, in the bitmap, 1 may indicate allocation of the corresponding resources for CSI-RS transmission and 0 may indicate non-allocation of the corresponding resources for CSI-RS transmission.

For example, locations for 20 CSI-RS resources can be set based on 2 CSI-RS ports. The bitmap may notify the UE of information on resources through which the CSI-RSs are transmitted within the preset unit resource allocation area.

When the information is applied to A0 to J1, designated as locations which can be used as the CSI-RS resources in FIG. 20, a bitmap such as [A0, A1, B0, B1, C0, C1, D0, D1, E0, E1, F0, F1, G0, G1, H0, H1, I0, I1, J0, J1]=[1, 1, 0, 0, 0, 0, 0, 0, 0, 0, 0, 0, 1, 1, 1, 1, 1, 1, 1, 1] may be configured. The example of the bitmap shows that resources corresponding to A0, A1, G0, G1, H0, H1, I0, I1, J0, and J1 are allocated as the CSI-RS resources.

In another example, locations for 10 CSI-RS resources can be set based on 4 CSI-RS ports. The bitmap may notify the UE of information on resources through which the CSI-RSs are transmitted within the preset unit resource allocation area.

When the information is applied to A0 to J1, designated as locations that can be used as the CSI-RS resources in FIG. 20, a bitmap such as [A0-A1, B0-B1, C0-C1, D0-D1, E0-E1, F0-F1, G0-G1, H0-H1, I0-I1, J0-J1]=[1, 0, 0, 0, 0, 0, 0, 0, 1, 1] may be configured. The example of the bitmap shows that resources corresponding to A0, A1, I0, I1, J0, and J1 are allocated as the CSI-RS resources.

In yet another example, locations for 5 CSI-RS resources can be set based on 8 CSI-RS ports. The bitmap may notify the UE of information on resources through which the CSI-RSs are transmitted within the preset unit resource allocation area.

When the information is applied to A0 to J1, designated as locations which can be used as the CSI-RS resources in FIG. 20, a bitmap such as A0-A1-B0-B1, C0-C1-D0-D1, E0-E1-F0-F1, G0-G1-H0-H1, I0-I1-J0-J1]=[1, 0, 0, 1, 1] may be configured. The example of the bitmap shows that resources corresponding to A0, A1, B0, B1, G0, G1, H0, H1, I0, I1, J0, and J1 are allocated as the CSI-RS resources.

As shown in the example based on the 8 CSI-RS ports, it is apparent that CSI-RSs can be transmitted in a number of REs smaller than the number of configured resources. For example, according to the bitmap based on the 8 CSI-RS ports, although the use of resources A0-A1-B0-B1 is notified, the CSI-RSs may be transmitted only at locations A0-A1, but may not be transmitted at locations B0-B1, like the example of FIG. 20.

In CMR resource configuration through the bitmap, port index mapping may be sequentially assigned based on an LSB or an MSB of the bitmap.

For example, like the example based on 4 CSI-RS ports, it is assumed that the bitmap providing notification of the locations of the resources is configured to be [A0-A1, B0-B1, C0-C1, D0-D1, E0-E1, F0-F1, G0-G1, H0-H1, I0-I1, J0-J1]=[1, 0, 0, 0, 0, 0, 0, 0, 1, 1]. To this end, the eNB may map CSI-RS port indexes based on the LSB of the bitmap. In this case, the UE may recognize that CSI-RS ports corresponding to nos. 15, 16, 17, and 18 are mapped to J0-J1, CSI-RS ports corresponding to nos. 19, 20, 21, and 22 are mapped to I0-I1, and CSI-RS ports corresponding to nos. 23, 24, 25, and 26 are mapped to A0-A1.

Otherwise, when the eNB maps CSI-RS port indexes based on the MSB of the bitmap, orders of the 4 CSI-RS ports allocated to the CSI-RS resources may be inversely assigned.

According to an embodiment, a method of enabling the UE to recognize an antenna array of the eNB in the FD-MIMO system may be provided.

More specifically, when the eNB maps CSI-RS resources and CSI-RS port indexes, the UE is required to determine relative locations of eNB antennas according to the CSI-RS port indexes to generate channel status information. The relative locations of the eNB antennas may be defined by the relationship between the CSI-RS and a codebook index.

Figure 21:
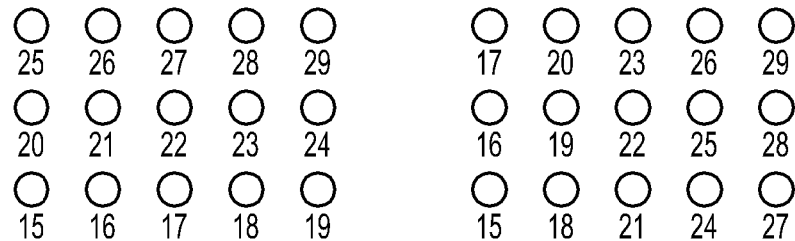
FIG. 21 illustrates an example in which the eNB maps CSI-RS resources and CSI-RS port indexes according to various embodiments proposed by the present disclosure.

FIG. 21 illustrates an example in which the eNB maps CSI-RS resources and CSI-RS port indexes according to various embodiments proposed by the present disclosure.

Referring to FIG. 21, in the full measurement, the eNB may map CSI-RS resources and CSI-RS port indexes based on a horizontal direction (drawing on the left side in FIG. 21) or map CSI-RS resources and CSI-RS port indexes based on a vertical direction (drawing on the right side in FIG. 21).

For example, based on the horizontal direction, the eNB may sequentially assign CSI-RS port indexes 15 to 19 while moving from the CSI-RS resource located at the left side in the last row in the CSI-RS resource array in a horizontal direction. Next, the eNB may move in a vertical direction and sequentially assign CSI-RS port indexes 20 to 24 while moving from the CSI-RS resource located at the left side in the second-last row in the CSI-RS resource array in the horizontal direction. In the same way, CSI-RS port indexes 25 to 29 may be sequentially assigned to the remaining CSI-RS resources.

In another example, based on the vertical direction, the eNB may sequentially assign CSI-RS port indexes 15 to 17 while moving from the CSI-RS resource located at the lower side on the first left column in the CSI-RS resource array in a vertical direction. Next, the eNB may move in a horizontal direction and sequentially assign CSI-RS port indexes 18 to 20 while moving from the CSI-RS resource located at the lower side on the second left column in the CSI-RS resource array in the vertical direction. In the same way, CSI-RS port indexes 21 to 29 may be sequentially assigned to the remaining CSI-RS resources.

Accordingly, if the UE recognizes a mapping rule between the CSI-RS resources and the CSI-RS port indexes by the eNB, the UE can predict the antenna array of the eNB.

According to an embodiment, when the eNB notifies the UE of $N_P=15$ and $N_H=5$, the UE may recognize a mapping relationship between CSI-RS resources and CSI-RS port indexes, as illustrated in FIG. 10. FIG. 10 is diagram based on a non-polarization antenna. However, mapping between CSI-RS resources and CSI-RS port indexes can be performed in the same way even when the non-polarization antenna is used.

However, in the partial measurement, the eNB may transmit CSI-RSs only in some of the CSI-RS resources, that is, not all the CSI-RS resources allocated to CSI-RS transmission. That is, in the partial measurement, the eNB may perform CSI-RS puncturing on CSI-RS resources allocated to a certain UE. In this case, the eNB is required to notify the UE of the TXRU through which the CSI-RS is transmitted. For example, in order to provide information on the TXRU for transmitting the CSI-RS, the eNB may use a cross-point indication method, a bitmap indication method, a hybrid bitmap indication method, and the like.

Method 1: Cross-Point Indication

Method 1 proposes a scheme in which the UE recognizes a CSI-RS puncturing pattern based on the location of a cross-point reference signal provided by the eNB.

More specifically, if the UE is aware of antenna configuration information $\{N_H,N_V\}$ of the eNB, the UE may recognize the CSI-RS puncturing pattern in the eNB only through the location of the cross-point reference signal. Here, the antenna configuration information $\{N_H,N_V\}$ of the eNB corresponds to information that defines an antenna array (or a CSI-RS pattern) by the number $N_H$ of antennas in a horizontal direction and the number $N_V$ of antennas in a vertical direction.

The location $\{N_C,M_C\}$ of the cross-point reference signal may be a location at which CSI-RS resources (CSI-RS ports) arranged in a horizontal direction and CSI-RS resources (CSI-RS ports) arranged in a vertical direction cross each other in the antenna array (or CSI-RS pattern) according to the antenna configuration information $\{N_H,N_V\}$ of the eNB. Here, $N_C$ denotes a horizontal index designating the location of the cross-point reference signal, and $M_C$ denotes a vertical index designating the location of the cross-point reference signal. The location $\{N_C,M_C\}$ of the reference signal may be provided to the UE by the eNB through higher-layer signaling or dynamic signaling.

When the UE acquires the antenna array (or CSI-RS pattern) according to the antenna configuration information $\{N_H,N_V\}$ of the eNB and the location $\{N_C,M_C\}$ of the cross-point reference signal, the UE may acquire, in the antenna array (or CSI-RS pattern), a CSI-RS puncturing pattern in which CSI-RS resources mapped to the remaining antennas (or CSI-RS ports) except for the antennas (or CSI-RS ports) arranged in the horizontal direction and the antennas (or CSI-RS ports) arranged in the vertical direction based on the acquired location $\{N_C,M_C\}$ of the cross-point reference signal are punctured.

To this end, the eNB may inform the UE of the location $\{N_C,M_C\}$ of the cross-point reference signal based on the assumption that the UE is already aware of the antenna configuration information $\{N_H,N_V\}$ to recognize the antenna array (or CSI-RS pattern). The location $\{N_C,M_C\}$ of the cross-point reference signal may be directly transmitted to the UE by the eNB or may be implicitly transmitted to the UE by the eNB through codebook configuration.

Figure 22:
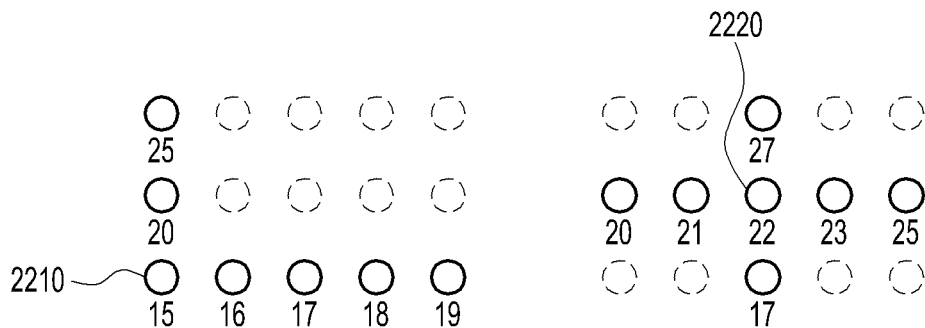
FIG. 22 illustrates examples for a location of a cross-point reference signal according to various embodiments proposed by the present disclosure.

FIG. 22 illustrates examples for the location of a cross-point reference signal according to various embodiments proposed by the present disclosure.

Referring to FIG. 22, a location 2210 or 2220 of a cross-point reference signal refers to a location of a cross-point reference signal used for measuring both a horizontal channel component and a vertical channel component.

For example, when the location of the cross-point reference signal is (0,0) in the state in which $N_H$ is 5 and $N_V$ is 3, the UE may infer a CSI-RS puncturing pattern used by the eNB, as illustrated on the left side in FIG. 22. In another example, when the location of the cross-point reference signal is (2,1) in the state in which $N_H$ is 5 and $N_V$ is 3, the UE may infer a CSI-RS puncturing pattern used by the eNB, as illustrated on the right side in FIG. 22.

Method 2: Bitmap Indication

Method 2 proposes a scheme in which the eNB configures a bitmap (or a sequence) indicating whether each of a predetermined number of CSI-RS ports is punctured (whether the CSI-RS is transmitted) and provide the configured bitmap to the UE, whereby the UE recognizes the CSI-RS puncturing pattern.

More specifically, the eNB may transmit a bit sequence of $N_r$ bits to the UE through higher-layer signaling. The number $N_P$ of bits in the bit sequence may correspond to a total number of CSI-RS ports. The $N_P$ bits in the bit sequence and a predetermined number of CSI-RS ports may be mapped one to one. In this case, one bit value in the bit sequence may indicate whether CSI-RS transmission is performed in one corresponding CSI-RS port among the CSI-RS ports. For example, when a value of a particular bit is 0, this indicates that CSI-RS transmission is not performed in a CSI-RS port corresponding to the particular bit (CSI-RS is off). When the value of the particular bit is 1, this indicates that CSI-RS transmission is performed in the CSI-RS port corresponding to the particular bit (CSI-RS is on).

Figure 23:
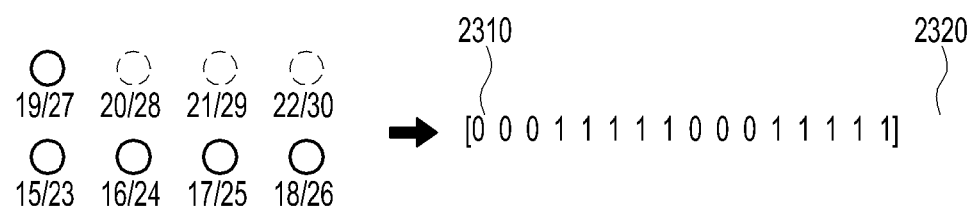
FIG. 23 illustrates an example in which the UE recognizes a CSI-RS puncturing pattern of the eNB based on a bitmap according to various embodiments proposed by the present disclosure.

FIG. 23 illustrates an example in which the UE recognizes a CSI-RS puncturing pattern of the eNB based on a bitmap according to various embodiments proposed by the present disclosure.

Referring to FIG. 23, it is assumed that cross-pole antennas in which $N_H$ is 4 and $N_V$ is 2 are used. In the drawing on the left of FIG. 23, relative locations according to CSI-RS port indexes assigned to CSI-RS ports are defined, and whether the CSI-RS ports transmit the CSI-RSs is displayed. For example, among CSI-RS ports, colored CSI-RS ports indicate TXRUs through which CSI-RSs are transmitted, and non-colored CSI-RS ports indicate TXRUs through which CSI-RSs are not transmitted.

The drawing on the right in FIG. 23 shows a bit sequence (or a bitmap) including bits indicating whether the CSI-RS is transmitted in each of the CSI-RS ports. The first bit, that is, the rightmost bit 2320 in the bit sequence, may correspond to an LSB, and the last bit, that is, the leftmost bit 2310, may correspond to an MSB.

For example, when nos. 15 to 30 are used as CSI-RS port indexes indicating the CSI-RS ports, the value of the LSB 2320 in the bit sequence may indicate whether the CSI-RS is transmitted in the CSI-RS port having CSI-RS port index 15. The following successive bit values may indicate whether CSI-RSs are transmitted in CSI-RS ports having CSI-RS port indexes increasing by 1 from no. 16. The value of the last bit, that is, the value of the MSB 2310, may indicate whether the CSI-RS is transmitted in the CSI-RS port having CSI-RS port index 30.

According to the above description, it may be noted that the bit sequence that is finally generated based on whether the CSI-RS is transmitted in each of the CSI-RS ports shown in the left drawing corresponds to [0001111100011111], as shown in the drawing on the right. In this case, a bit value of 0 indicates that the CSI-RS is not transmitted and a bit value of 1 indicates that the CSI-RS is transmitted.

Method 3: Hybrid Bitmap Indication

Method 3 proposes a scheme in which the eNB notifies the UE of a CSI-RS puncturing pattern based on a combination of method 1 using cross-point indication and method 2 using bitmap indication.

More specifically, the bitmap assumes that CSI-RS ports for measuring one of vertical and horizontal directions are designated to 0 and CSI-RS ports for measuring the remaining direction are designated to 1.

For example, when $N_H$ is 4, $N_V$ is 2, and the bitmap is [0 0 0 0 1 1], the first four CSI-RS ports are used for measuring a horizontal channel and the last two CSI-RS ports are used for measuring a vertical channel. At this time, an inverse bit of the corresponding group may be allocated to a cross-point reference signal and then announced. For example, when the location of the cross-point reference signal $\{N_C, M_C\}$ is $\{3,1\}$, bits of a fourth CSI-RS port in a horizontal direction and a second CSI-RS port in a vertical direction should be changed, so that the bitmap may be changed from [0 0 0 0 1 1] to [0 0 0 1 1 0].

Figure 24:
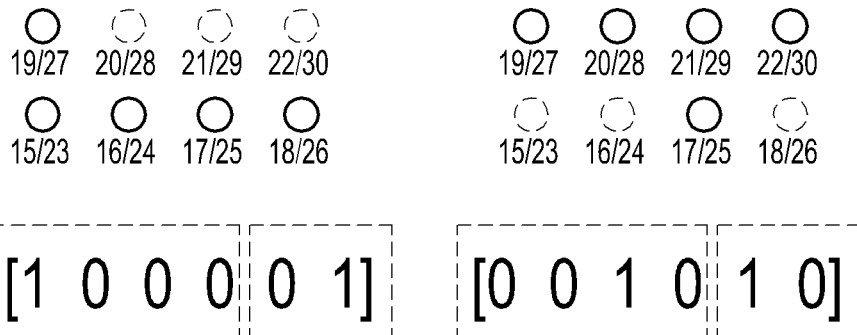
FIG. 24 illustrates an example of recognizing a CSI-RS puncturing pattern by the hybrid bitmap indication according to various embodiments proposed by the present disclosure.

FIG. 24 illustrates an example of recognizing a CSI-RS puncturing pattern by the hybrid bitmap indication according to various embodiments proposed by the present disclosure.

Referring to FIG. 24, it is assumed that orthogonal polarization antennas in which $N_H$ is 4 and $N_V$ is 2 are used. The drawing on the left in FIG. 23 shows a bitmap sequence for a location of a cross-point reference signal in which $N_C$ is 0 and $M_C$ is 0, and the drawing on the right shows a bitmap sequence for a location of a cross-point reference signal in which $N_C$ is 2 and $M_C$ is 1. In this case, the result of the bitmap sequence may vary depending on the detailed definition (bit allocation for each CSI-RS port group) previously made.

According to an embodiment, a method by which the eNB shares, which the UE, information indicating whether CSI-RS resources are actually used in the FD-MIMO system may be provided. This is to prevent the generation of additional interference or noise due to CSI-RS resources through which CSI-RSs are not transmitted among CSI-RS resources allocated to a certain UE.

More specifically, when the CSI-RS puncturing pattern is indicated based on the bitmap, the eNB may notify the UE of information on a location at which there is no CSI-RS (a null location). The eNB may inform the UE of codebook coefficients that are not used for generating channel status information.

Figure 25:
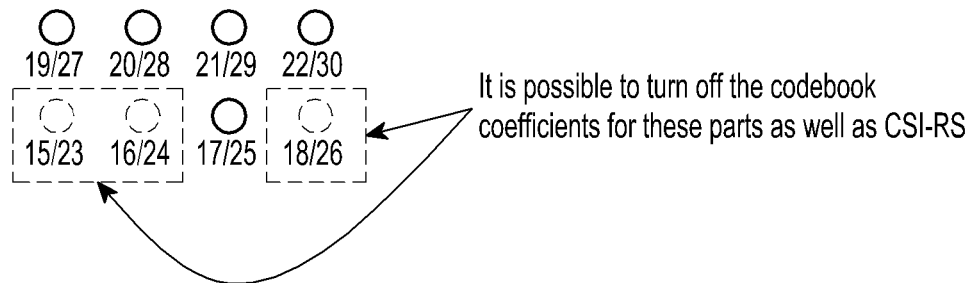
FIG. 25 illustrates an example of providing notification of CSI-RSs that are not used in the FD-MIMO system according to various embodiments proposed by the present disclosure.

FIG. 25 illustrates an example of providing notification of CSI-RSs that are not used in the FD-MIMO system according to various embodiments proposed by the present disclosure.

Referring to FIG. 25, in order to enable the UE to generate channel status information through 5 RSI-RSs, the eNB may allocate 8 CSI-RS resources to the UE and may not transmit CSI-RSs in three CSI-RS resources among the 8 allocated CSI-RS resources.

In this case, when the UE is not aware of the 3 CSI-RS resources through which the CSI-RSs are not transmitted, additional interference or noise may be generated in the 3 CSI-RS resources through which the CSI-RSs are not transmitted.

Through various methods, the eNB may notify a certain UE of a CSI-RS puncturing pattern indicating at least one CSI-RS resource through which CSI-RS transmission is not performed, among the CSI-RS resources allocated to the certain UE. Accordingly, it is possible to prevent the unnecessary occurrence of performance deterioration due to non-transmission of CSI-RSs in some of the allocated CSI-RS resources.

According to an embodiment, a method of mapping at least two CSI-RS resources among a plurality of CSI-RS resources set by the eNB to configure CMR to one CSI-RS port in the FD-MIMO system may be provided. That is, a CMR operation type in which respective CSI-RS resources share some CSI-RS port indexes is proposed.

Figure 26:
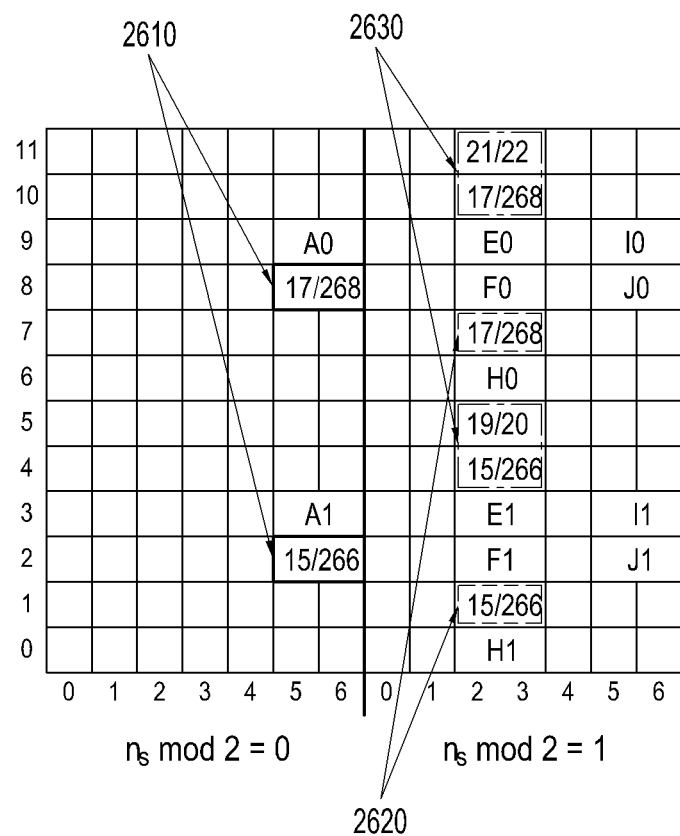
FIG. 26 illustrates an example in which respective CSI-RS resources share some CSI-RS port indexes in the FD-MIMO system according to various embodiments proposed by the present disclosure.

FIG. 26 illustrates an example in which respective CSI-RS resources share some CSI-RS port indexes in the FD-MIMO system according to various embodiments proposed by the present disclosure.

Referring to FIG. 26, one CMR may be configured by a total of three CSI-RS resource components 2610, 2620, and 2630. Each of the three CSI-RS resource components 2610, 2620, and 2630 may have CSI-RS port indexes 15 to 18. Each of the three CSI-RS resource components 2610, 2620, and 2630 may be handled as independent resources from each other. In this case, the three CSI-RS resource components 2610, 2620, and 2630 may be used for generating different CSIs.

For example, the eNB may apply different beamforming-weighted values to the three CSI-RS resource components 2610, 2620, and 2630 and transmit CSI-RSs to the UE based on the different beamforming-weighted values. The UE may generate CSIs based on CSI-RS resource indexes that the UE prefers and CSI-RS ports of corresponding CSI-RS resources. The UE may report the generated CSIs to the eNB.

In another example, the eNB may apply different beamforming-weighted values to the three CSI-RS resource components 2610, 2620, and 2630 and transmit the CSI-RS resource components to the UE. In this case, the UE can generate CSIs based on the CSI-RS ports transmitted in respective CSI-RS resources and report all of the generated CSIs to the eNB.

Figure 27:
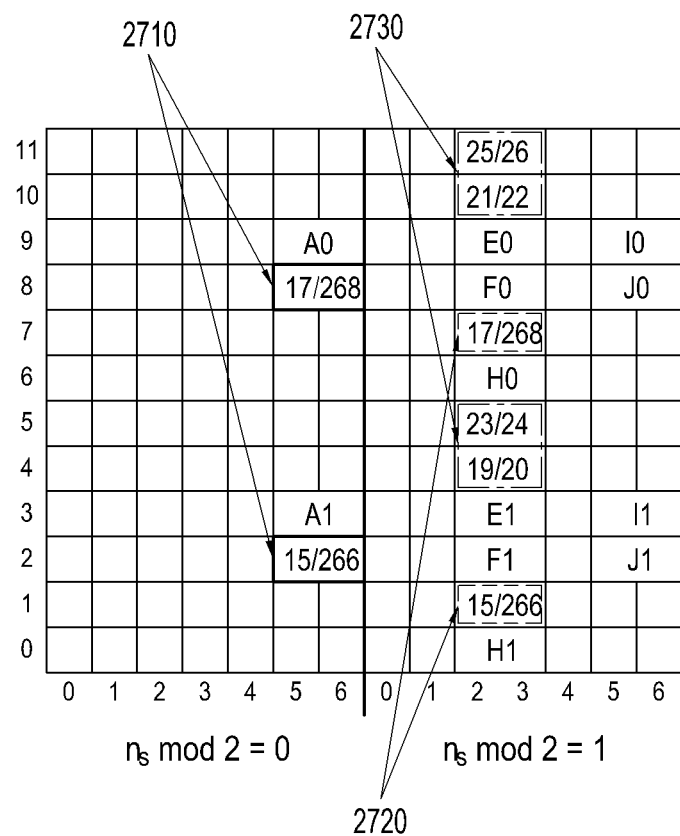
FIG. 27 illustrates another example in which respective CSI-RS resources share some CSI-RS port indexes in the FD-MIMO system according to various embodiments proposed by the present disclosure.

FIG. 27 illustrates another example in which respective CSI-RS resources share some CSI-RS port indexes in the FD-MIMO system according to various embodiments proposed by the present disclosure.

Referring to FIG. 27, some CSI-RS resources are associated with each other, and the remaining CSI-RS resources can be operated as independent resources.

For example, one CMR may be configured by a total of three CSI-RS resource components 2710, 2720, and 2730. Two CSI-RS resource components 2710 and 2730 among the three CSI-RS resource components 2710, 2720, and 2730 may be associated with each other and operated as one CSI-RS resource, and the remaining one resource component 2720 may be operated as a separate CSI-RS resource.

In this case, the UE may generate one CSI based on CSI-RS ports transmitted in the 2 CSI-RS resource components 2710 and 2730 operated as one CSI-RS resource. The UE may generate another CSI based on a CSI-RS port transmitted in the one CSI-RS resource component 2720 operated as the separate CSI-RS resource. The UE can report the CSI-RS resource index, which the UE prefers, and the corresponding CSI to the eNB using the other CSI.

In another example, the UE can generate one CSI based on CSI-RS ports transmitted in two CSI-RS resource components 2710 and 2730 operated as one CSI-RS resource, generate another CSI based on the CSI-RS port transmitted in one CSI-RS resource component 2720 operated as the separate CSI-RS resource, and report the CSI-RS resource index that the UE prefers and the corresponding CSI to the eNB using both CSIs.

According an embodiment, a signaling procedure on a higher layer for configuring one or more CSI-RS resources for CMR configuration in the FD-MIMO system may be provided.

FIG. 28 illustrates an example of one CSI process in which a plurality of CSI-RSs is configured according to various embodiments proposed by the present disclosure.

Referring to FIG. 28, a total of N Non-Zero Power (NZP) CSI-RS resources can be managed using an ID list 2830 or using N CSI-RS configuration lists. In this case, the number of CSI-RS ports included in each CSI-RS resource may be configured as indicated by reference numeral 2840.

The number 2820 of all CSI-RS ports may be configured by one CSI process 2810. In this case, the number 2820 of all CSI-RS ports may be equal to or smaller than the total sum of the numbers 2840 configured for respective NZP CSI-RS arrays.

Alternatively, the number of all CSI-RS ports included in one CSI process 2810 may be defined by a total sum of the numbers 2840 configured for NZP CSI-RS arrays. In this case, the number 2820 of all CSI-RS ports may be omitted.

Alternatively, all CSI-RS resources included in one CSI process 2810 may be configured to have the same number of CSI-RS ports. In this case, the number of CSI-RS ports in each CSI-RS resource may be configured by the number 2820 of all CSI-RS ports and the numbers 2840 configured for each of the NZP CSI-RS arrays.

The configuration of the number 2820 of all CSI-RS ports is only one example, and, particularly, can be designated as {an1, an2, an4, an8} in this example. In this example, the total number of CSI-RS ports included in the CMR may be defined as the product of the number of CSI-RS ports and the number of CSI-RS resources.

Meanwhile, the number of CSI-RS ports in the proposed embodiment is not limited to a particular number, but can be configured to include various numbers, such as 30, 32, 56, 64, and the like.

FIG. 29 illustrates another example of one CSI process in which a plurality of CSI-RSs is configured according to various embodiments proposed by the present disclosure.

Referring to FIG. 29, as indicated by reference numeral 2930, a total of N Non-Zero Power (NZP) CSI-RS resources may be directly configured. At this time, it is assumed that N is 2. One CSI process 2910 may designate the total number of CSI-RS ports, as indicated by reference numeral 2920. Further, for the same reason as that of the principle by which reference numeral 2820, which has been described with reference to FIG. 28, is omitted, reference numeral 2920 may also be omitted. The number of CSI-RS ports is not limited to the example of reference numerals 2820 and 2920, and may be configured to include various numbers such as 30, 32, 56, 64, and the like.

FIG. 30 illustrates another example of configuring CSI-RS ports according to various embodiments proposed by the present disclosure.

As illustrated in FIG. 30, higher-layer (RRC) signaling for configuring CSI-RS resources including CSI-RS ports, for example, 12 or 16 CSI-RS ports except for {1, 2, 4, 8} CSI-RS ports can be configured based on a plurality of CSI-RS resources (Release 12 CSI-RS resources).

For example, an indicator 3020 indicating the location of CSI-RS resources may be an indicator indicating the location of one of CMRs made by a combination of the existing CSI-RS resources when the number of CSI-RS ports designated by reference numeral 3010 is not one of {1, 2, 4, 8}.

For example, in reference numeral 3010, it may be assumed that the number of CSI-RS ports is 16 and that the CMRs constituting the sixteen CSI-RS ports consist of two CSI-RS port groups. In this case, one CSI-RS port group may consist of eight CSI-RS ports.

The indicator designated by reference numeral 3020 may indicate the use of one CMR pattern among a predetermined number of CMR patterns.

Figure 31:
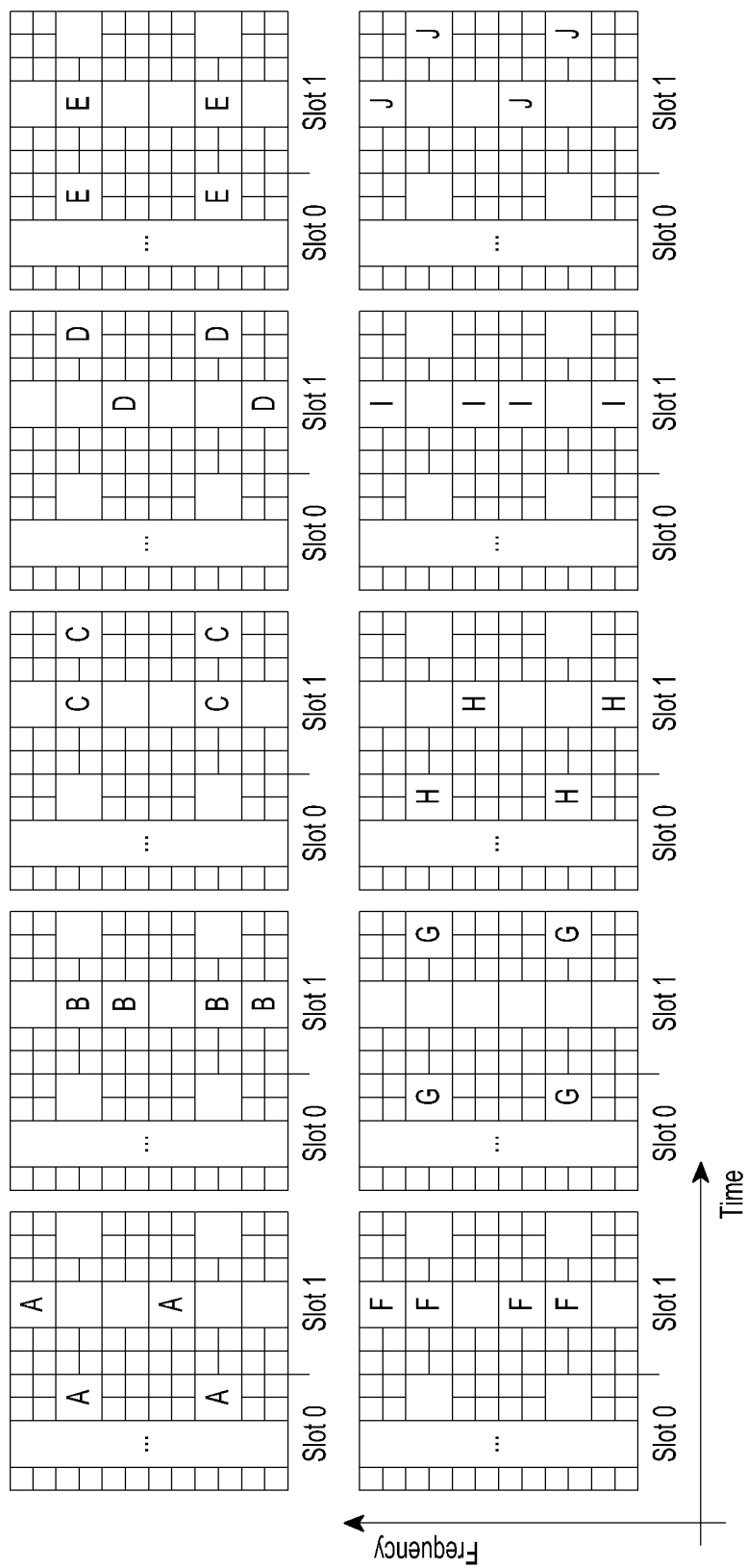
FIG. 31 illustrates an example of a Channel Measurement Resource (CMR) pattern according to various embodiments proposed by the present disclosure.

FIG. 31 illustrates an example of a CMR pattern according to various embodiments proposed by the present disclosure.

Referring to FIG. 31, a total of ten CMR patterns from A to J may be generated. An indicator may be designated in advance to each of the ten CMR patterns A to J. For example, it may be prearranged to use the pattern A when the CMR pattern indicator is 0, use the pattern B when the CMR pattern indicator is 1, use the pattern C when the CMR pattern indicator is 2, and use the pattern J when the CMR pattern indicator is 9.

The order of the CMR patterns A to J is not important, and may be changed depending on the situation. Further, the indicators may be mapped only to some patterns, that is, not all the patterns, and mapping of the indictors to some patterns may be omitted as necessary.

For example, when CSI-RSs are transmitted in twelve CSI-RS ports, as indicated by reference numerals 2710 and 2730 of FIG. 27, CSI-RS resources are allocated by the pattern A in FIG. 31, and the CSI-RSs can be transmitted in only some (that is, reference numerals 2710 and 2730) of the allocated CSI-RS resources.

Meanwhile, unlike current CSI-RS mapping, which supports only Code Division Multiplexing (CDM) for two adjacent OFDM symbols, that is, CDM-2, CDM-4 for four REs can be supported for various reasons, such as CSI-RS power boosting and the like.

In this case, one CDM group may be generated by a combination of two CDM groups, each of which includes two REs, and an Orthogonal Cover Code (OCC) having a length of 4 for CDM-4 may be applied to four REs included in the new one CDM group. It is apparent that the two CDM groups, each of which includes two REs, may exist in the same OFDM symbol or different OFDM symbols.

When only time domain CDM-4 is considered for convenience of CSI-RS mapping, all REs included in one CDM group should be located in different OFDM symbols. This means that two CDM groups, each of which includes two REs, should be located in different OFDM symbols.

Figure 32:
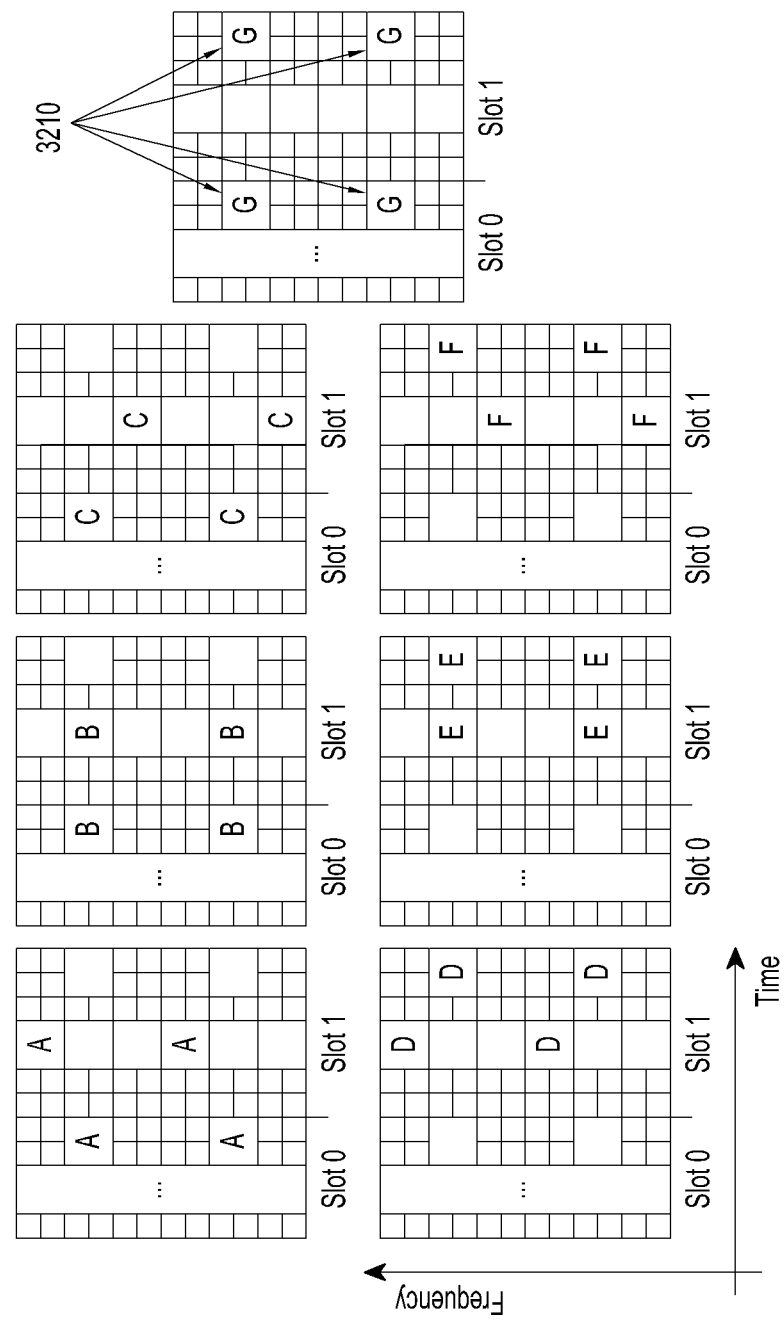
FIG. 32 illustrates an example in which a resource indicator indicates a CMR pattern according to various embodiments proposed by the present disclosure.

FIG. 32 illustrates an example in which a resource indicator indicates a CMR pattern according to various embodiments proposed by the present disclosure.

Referring to FIG. 32, seven patterns (A to G) may correspond to patterns that meet a predetermined condition (previously proposed condition) among the ten patterns (illustrated in FIG. 31). Accordingly, each of the seven patterns may be limited to being indicated by the resource indicator (3020 in FIG. 30).

For example, it is possible to arrange to use the pattern A when the resource indicator is 0, use the pattern B when the resource indicator is 1, and use the pattern G when the resource indicator is 7. When the pattern G 3210 having the maximum distance between REs is excluded in consideration of a phase shift generated by a time offset between CSI-RS REs, the resource indicators can be limited to indicate six patterns corresponding to the patterns A to F.

The examples illustrated in FIGS. 30 and 31 are based on the assumption that CMRs constituting sixteen CSI-RS ports include two CDM groups (each CDM group includes eight CSI-RS resources corresponding to eight CSI-RS ports). In this case, when a combination of legacy CSI-RS resources included in the CMRs is changed, the pattern thereof may be also changed. For example, when the assumption is changed as in the case in which CMRs including sixteen CSI-RS ports consist of four CDM groups (each CDM group includes four CSI-RS resources corresponding to four CSI-RS ports), CMRs including twelve CSI-RS ports consist of one CDM group including eight CSI-RS ports and another group including four CSI-RS ports, or CMRs including twelve CSI-RS ports consist of three CDM groups (each CDM group includes four CSI-RS resources corresponding to four CSI-RS ports), the number of pattern or forms may be changed to be suitable therefor.

Figure 33:
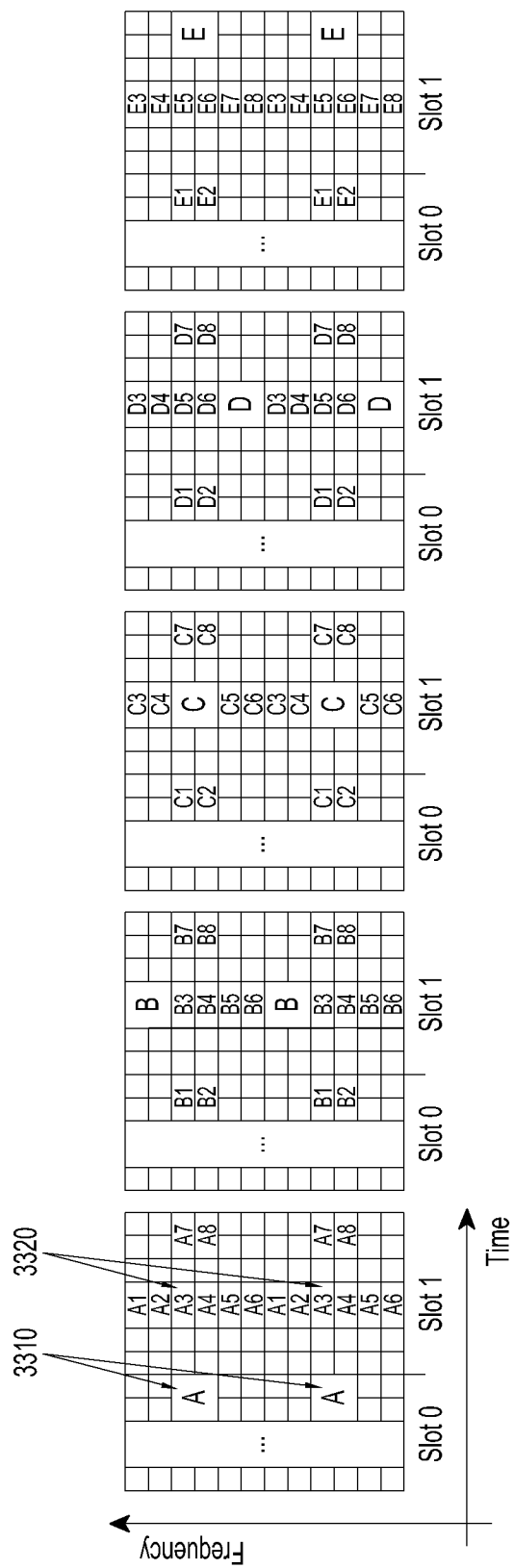
FIG. 33 illustrates an example of a pattern in which CSI-RS resources are allocated according to various embodiments proposed by the present disclosure.

FIG. 33 illustrates an example of a pattern in which CSI-RS resources are allocated according to various embodiments proposed by the present disclosure.

Referring to FIG. 33, forty patterns can be configured when, for example, CMRs including twelve CSI-RS ports consist of one CDM group including eight CSI-RS ports and another CDM group including four CSI-RS ports.

When CIS-RS resources corresponding to one CDM group including eight CSI-RS ports are configured by a pattern A 3310, one of the eight CDM groups expressed by patterns A1 to A8 may be additionally configured. Each of the eight CDM groups expressed by the patterns A1 to A8 may include four CSI-RS ports.

Similarly, 8-port CSI-RS resources may have forty patterns, since each of the patterns B, C, D, and E has eight selections for 4-port CSI-RS resources. In this case, it may be prearranged to use patterns (A, A1) when the resource indicator 2920 of FIG. 29 is 0, use patterns (A, A2) when the indicator is 1, use patterns (A, A3) when the indicator is 2, and use patterns (E, E8) when the indicator is 39.

The example illustrates all patterns configured by 8-port CSI-RS resources and one 4-port CSI-RS resources, but selection of some patterns may be limited in consideration of CDM-4 configuration or UE complexity, like the example illustrated in FIG. 3.

In another example, when 12-port CMRs consist of three 4-port CSI-RS resources, three 4-port CSI-RS resources are selected from a total of ten 4-port CSI-RS resources, and thus $$\binom{10}{3} = 120$$

patterns can be configured. In this case, the shape of each pattern may be expressed in the same way as the examples illustrated in FIGS. 30 and 32. Accordingly, a detailed description therefor will be omitted. Meanwhile, in this example, all REs included in one CDM group may be limited to being located in different OFDM symbols in consideration of time domain CDM-4, like the example illustrated in FIG. 31.

As one method therefor, three 4-port CSI-RS resources may be limited to being located in different OFDM symbols. Thereafter, CDM groups, each of which includes two REs constituting each legacy CSI-RS resource, may be connected to CDM groups located in different OFDM symbols to form one new CDM group for CDM-4.

Figure 34:
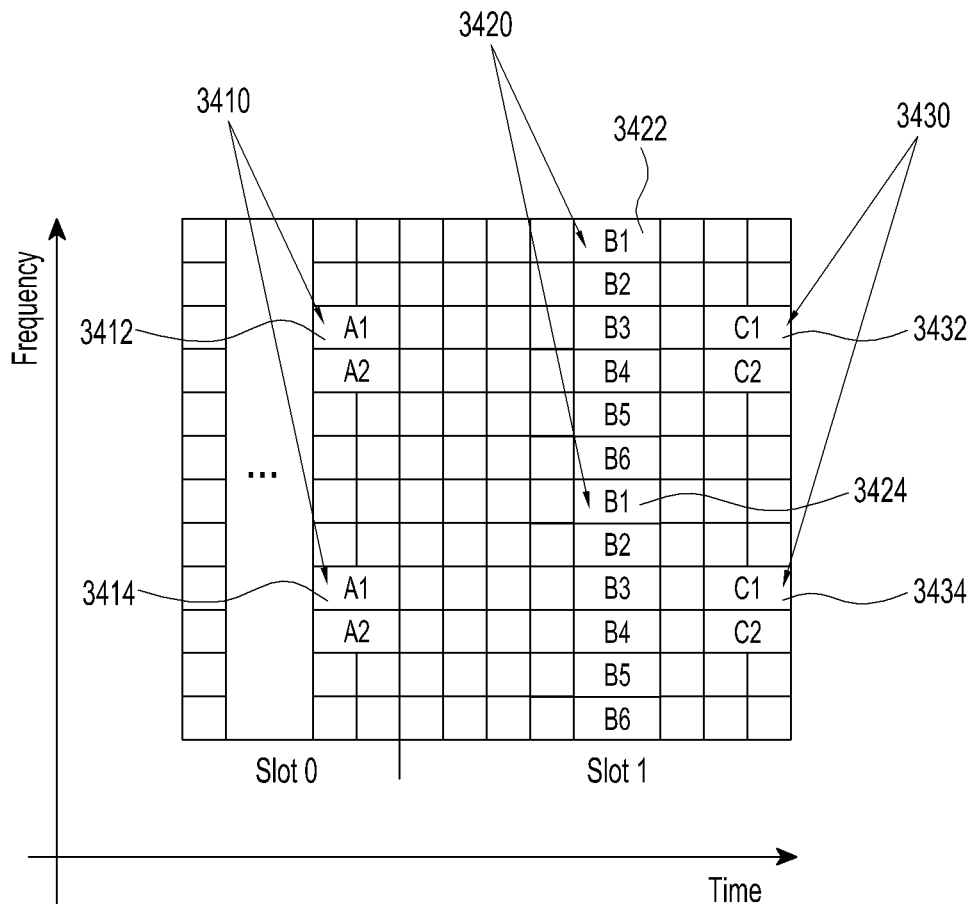
FIG. 34 illustrates another example of the pattern in which CSI-RS resources are allocated according to various embodiments proposed by the present disclosure.

FIG. 34 illustrates another example of the pattern in which CSI-RS resources are allocated according to various embodiments proposed by the present disclosure.

Referring to FIG. 34, three 4-port CSI-RS resources may have a pattern A1 3410, a pattern B1 3420, and a pattern C1 3430. In this case, for example, in the configuration of new CMS groups for CDM-4, reference numerals 3412 and 3422 may form a new CDM group, reference numerals 3424 and 3432 may form another new CDM group, and reference numerals 3434 and 3414 may form yet another new CDM group.

In this example, 4-port CSI-RS patterns for constituting a 12-port CSI-RS pattern may be selected from one of {A1, A2}, one of {B1, B2, B3, B4, B5, B6}, and one of {C1, C2} in FIG. 33. Accordingly, a total of twenty-four 12-port CSI-RS patterns is available.

Meanwhile, although the detailed description of the present disclosure includes concrete embodiments, the embodiments may be variously modified by those skilled in the art without departing from the scope according to various embodiments proposed by the present disclosure. Therefore, the scope of the present disclosure should not be defined as being limited to the aforementioned embodiments, but should be defined by the appended claims and equivalents thereof. Also, such modified embodiments should not be construed as falling outside of the scope of the technical idea or prospect of the present disclosure.

The invention claimed is:

1. A method of transmitting a reference signal by an evolved nodeB (eNB), the method comprising:
   transmitting, to a user equipment (UE), configuration information comprising information on at least two channel status information reference signal (CSI-RS) resources, information on a number of CSI-RS ports, and information on at least two CSI interference measurement (CSI-IM) resources; and
   transmitting, to the UE, plurality of CSI-RSs by using the at least two CSI-RS resources and a total number of CSI-RS ports,
   wherein the total number of CSI-RS ports is determined by a product of a number of the at least two CSI-RS resources and the number of CSI-RS ports,
   wherein the information on the at least two CSI-RS resources includes an index list of the at least two CSI-RS resources,
   wherein the information on the number of CSI-RS ports indicates a number of antenna ports corresponding to each one of the at least two CSI-RS resources, and
   wherein the information on the number of CSI-RS ports indicates 2, 4, or 8, and the total number of CSI-RS ports is more than eight.

2. The method of claim 1, wherein each one of the at least two CSI-RS resources is associated with the same number of CSI-RS ports.

3. The method of claim 1, wherein the information on the at least two CSI-RS resources includes information on at least one resource pattern of at least two CSI-RSs.

4. An evolved nodeB (eNB) for transmitting a reference signal in a wireless communication system, the eNB comprising:
   a transceiver; and
   a processor configured to control the transceiver to:
      transmit, to a user equipment (UE), configuration information comprising information on at least two channel status information reference signal (CSI-RS) resources, information on a number of CSI-RS ports, and information on at least two CSI interference measurement (CSI-IM) resources, and transmit, to the UE, a plurality of CSI-RSs by using the at least two CSI-RS resources and a total number of CSI-RS ports, wherein the total number of CSI-RS ports is determined by a product of a number of the at least two CSI-RS resources and the number of CSI-RS ports, wherein the information on the at least two CSI-RS resources includes an index list of the at least two CSI-RS resources, wherein the information on the number of CSI-RS ports indicates a number of antenna ports corresponding to each one of the at least two CSI-RS resources, and wherein the information on the number of CSI-RS ports indicates 2, 4, or 8, and the total number of CSI-RS ports is more than eight.

5. The eNB of claim 4, wherein each one of the at least two CSI-RS resources is associated with the same number of CSI-RS ports.

6. The eNB of claim 4, wherein the information on the at least two CSI-RS resources includes information on at least one resource pattern of at least two CSI-RSs.

7. A method by a user equipment (UE) in a wireless communication system, the method comprising:

receiving, from an evolved nodeB (eNB), configuration information comprising information on at least two channel status information reference signal (CSI-RS) resources, information on a number of CSI-RS ports, and information on at least two CSI interference measurement (CSI-IM) resources; and receiving, from the eNB, a plurality of CSI-RSs by using the at least two CSI-RS resources and a total number of CSI-RS ports, wherein the total number of CSI-RS ports is determined by a product of a number of the at least two CSI-RS resources and the number of CSI-RS ports, wherein the information on the at least two CSI-RS resources includes an index list of the at least two CSI-RS resources, wherein the information on the number of CSI-RS ports indicates a number of antenna ports corresponding to each one of the at least two CSI-RS resources, and wherein the information on the number of CSI-RS ports indicates 2, 4, or 8, and the total number of CSI-RS ports is more than eight.

8. The method of claim 7, wherein each one of the at least two CSI-RS resources is associated with the same number of CSI-RS ports.

9. The method of claim 7, wherein the information on the at least two CSI-RS resources includes information on at least one resource pattern of at least two CSI-RSs.

10. A user equipment (UE) in a wireless communication system, the UE comprising:

a transceiver; and a processor configured to control the transceiver to:

receive, from an evolved nodeB (eNB), configuration information comprising information on at least two channel status information reference signal (CSI-RS) resources, information on a number of CSI-RS ports, and information on at least two CSI interference measurement (CSI-IM) resources, and receive, from the eNB, at least two CSI-RSs by using the at least two CSI-RS resources and a total number of CSI-RS ports, wherein the total number of CSI-RS ports is determined by a product of a number of the at least two CSI-RS resources and the number of CSI-RS ports, wherein the information on the at least two CSI-RS resources includes an index list of the at least two CSI-RS resources, wherein the information on the number of CSI-RS ports indicates a number of antenna ports corresponding to each one of the at least two CSI-RS resources, and wherein the information on the number of CSI-RS ports indicates 2, 4, or 8, and the total number of CSI-RS ports is more than eight.

11. The UE of claim 10, wherein each one of the at least two CSI-RS resources is associated with the same number of CSI-RS ports.

12. The UE of claim 10, wherein the information on the at least two CSI-RS resources includes information on at least one resource pattern of at least two CSI-RSs.

* * * * *